United States Patent

Kaneko

[11] Patent Number: 5,959,861
[45] Date of Patent: Sep. 28, 1999

[54] ADAPTIVE ROBUST CONTROL DEVICE

[75] Inventor: Junji Kaneko, Kawasaki, Japan

[73] Assignee: Fujitsu Limited, Kawasaki, Japan

[21] Appl. No.: 08/859,107

[22] Filed: May 20, 1997

[30] Foreign Application Priority Data

Oct. 31, 1996 [JP] Japan .................................... 8-288930

[51] Int. Cl.[6] .......................... G05B 13/04; G05B 13/02
[52] U.S. Cl. .............. 364/149; 364/148.01; 364/474.01; 364/474.02; 364/474.37
[58] Field of Search .......................... 364/373, 160–164, 364/148.01, 149–159, 176–177, 183, 474.01, 474.37, 474.02, 474.03, 474.05, 474.06; 477/175, 176, 180; 318/568.1, 568.13, 568.18, 632, 560–646

[56] References Cited

U.S. PATENT DOCUMENTS

| | | | |
|---|---|---|---|
| 4,719,561 | 1/1988 | Shigemasa | 364/148 |
| 4,725,965 | 2/1988 | Keenan | 364/513 |
| 4,771,389 | 9/1988 | Takahashi et al. | 364/513 |
| 5,049,796 | 9/1991 | Seraji | 318/568.1 |
| 5,162,713 | 11/1992 | Mohri et al. | 318/568.19 |
| 5,179,514 | 1/1993 | Rastegar et al. | 364/167.01 |
| 5,272,423 | 12/1993 | Kim | 318/560 |
| 5,403,249 | 4/1995 | Slicker | 477/176 |
| 5,444,612 | 8/1995 | Torii et al. | 364/161 |
| 5,459,383 | 10/1995 | Sidman et al. | 318/611 |
| 5,517,411 | 5/1996 | Genise et al. | 364/424.1 |

OTHER PUBLICATIONS

A robust motion control of manipulators with parametric unce, Decision and control, 1995 34 th Annual Conference, vol. 2, Junji Kaneko, pp. 1609–1611, Dec. 1995.

J.C. Doyle, et al., "State–Space Solutions to Standard $H_2$ and $H_\infty$ Control Problems", IEEE Transactions, vol. 34, No. 8, pp. 831–847, (Aug. 1989).

J. Doyle, et al., "Mixed $H_2$ and $H_\infty$ Performance Objectives II: Optimal Control", IEEE Transactions, vol. 39, No. 8, pp. 1575–1587, (Aug. 1994).

*Primary Examiner*—William Grant
*Assistant Examiner*—Ramesh Patel
*Attorney, Agent, or Firm*—Staas & Halsey

[57] ABSTRACT

A system control device, specifically a control device for allowing a robot manipulator to track an object trajectory, can allow a system to track the object trajectory under undesirable conditions such as an unknown physical parameter featuring a dynamic characteristic and random disturbance. The device comprises a parameter estimation unit 1 for estimating the physical parameters of the system; an adaptive linearization input generation unit 2 for generating a partial input for adaptive linearization compensation for the system based on the estimation result; and a robustness partial input generation unit 3 for generating a partial input to improve the robustness of the system linearized by the partial input. Thus, the robustness of the system can be improved even if the physical parameters cannot be accurately estimated.

17 Claims, 26 Drawing Sheets

| PHYSICAL PARAMETER | SYMBOL | VALUE (DIMENSION) |
|---|---|---|
| MASS OF FIRST LINK | $m_1$ | 2.48 (kg) |
| MASS OF SECOND LINK | $m_2$ | 2.85 (kg) |
| LENGTH OF FIRST LINK | $l_1$ | 0.7 (m) |
| LENGTH OF SECOND LINK | $l_2$ | 0.7 (m) |
| CENTER OF MASS OF FIRST LINK | $a_1$ | 0.5 (m) |
| CENTER OF MASS OF SECOND LINK | $a_2$ | 0.5 (m) |
| MOMENT OF INERTIA OF FIRST LINK | $I_1$ | 0.2 (kgm$^2$) |
| MOMENT OF INERTIA OF SECOND LINK | $I_2$ | 0.2 (kgm$^2$) |
| MOMENT OF INERTIA OF FIRST ACTUATOR | $J_1$ | 0.1 (kgm$^2$) |
| MOMENT OF INERTIA OF SECOND ACTUATOR | $J_2$ | 0.1 (kgm$^2$) |
| TORQUE CONSTANT OF FIRST ACTUATOR | $k_1$ | 1.0 |
| TORQUE CONSTANT OF SECOND ACTUATOR | $k_2$ | 0.75 |

FIG. 9

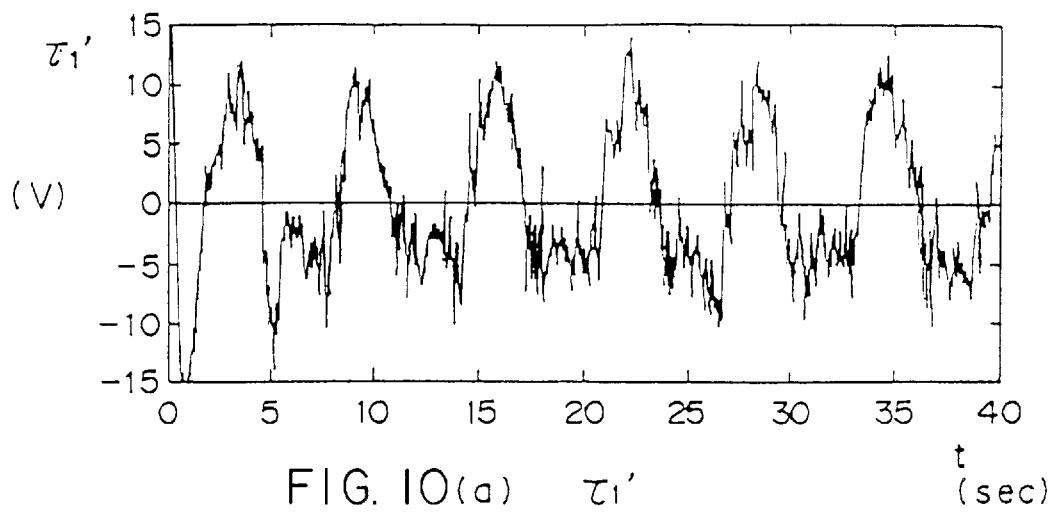
FIG. 10(a) $\tau_1'$
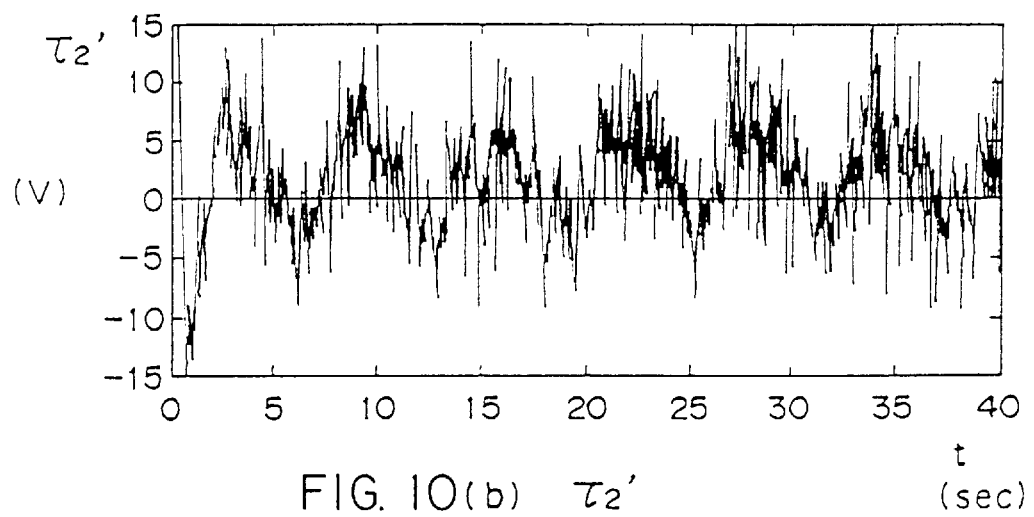
FIG. 10(b) $\tau_2'$

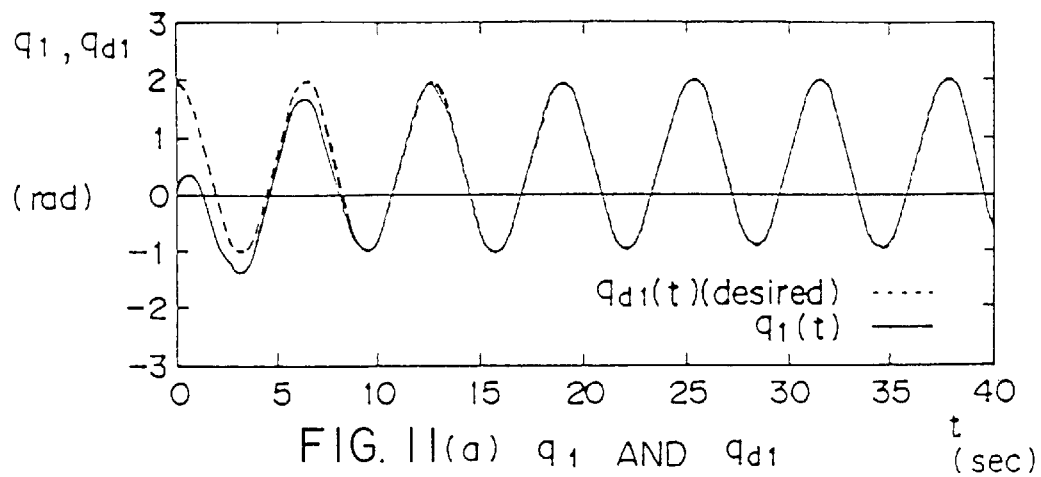
FIG. 11(a) $q_1$ AND $q_{d1}$
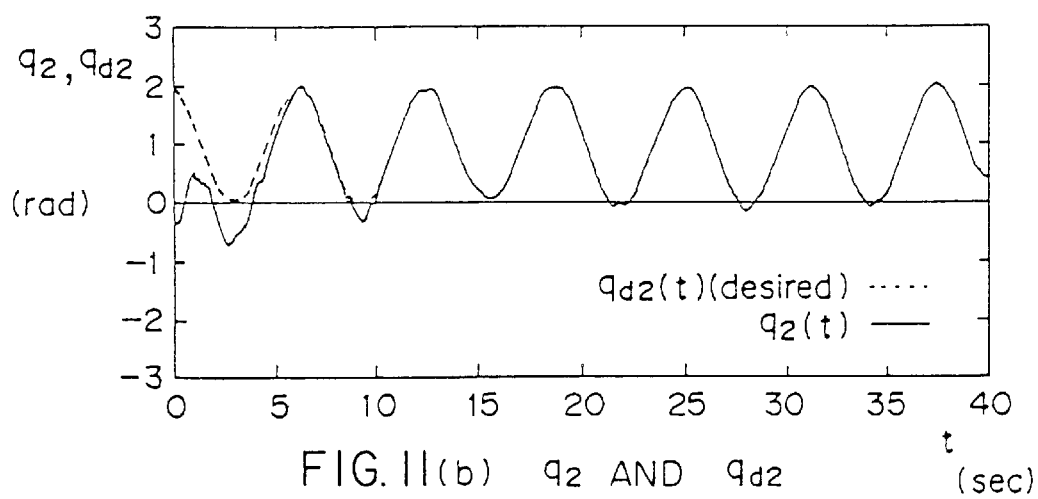
FIG. 11(b) $q_2$ AND $q_{d2}$

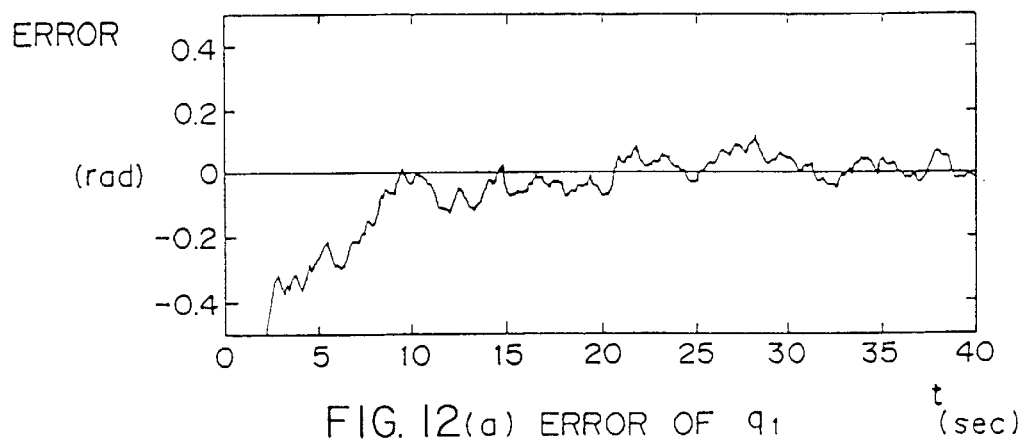
FIG. 12(a) ERROR OF $q_1$
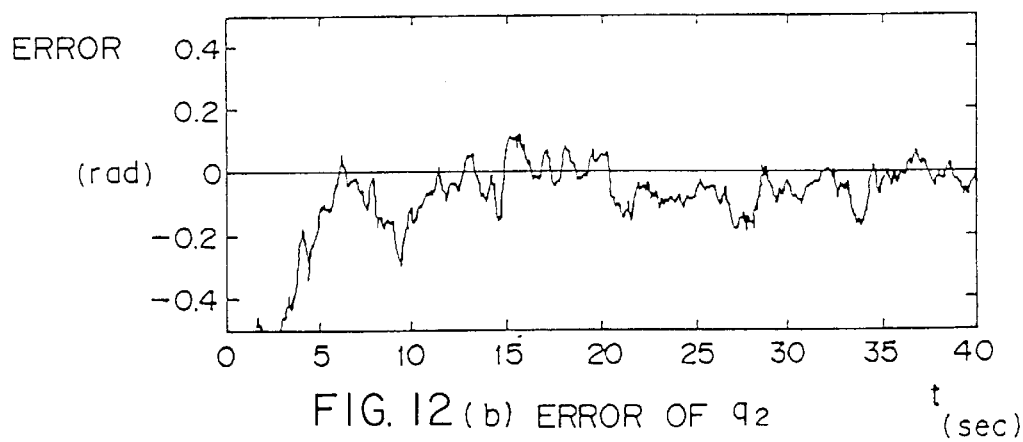
FIG. 12(b) ERROR OF $q_2$

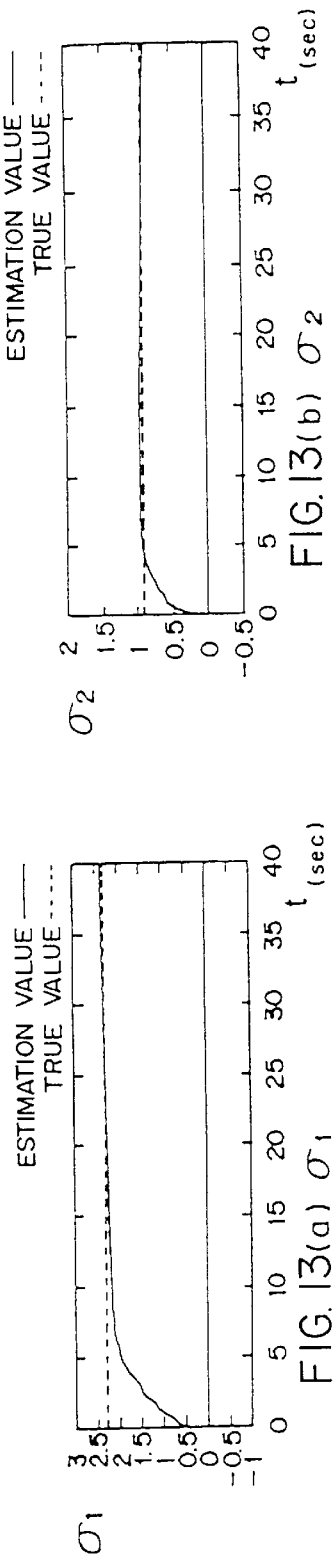

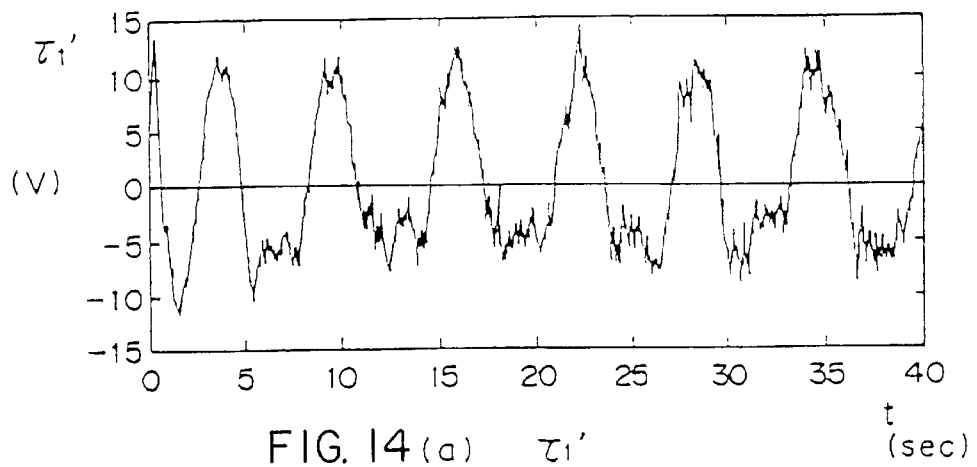
FIG. 14(a) $\tau_1{}'$
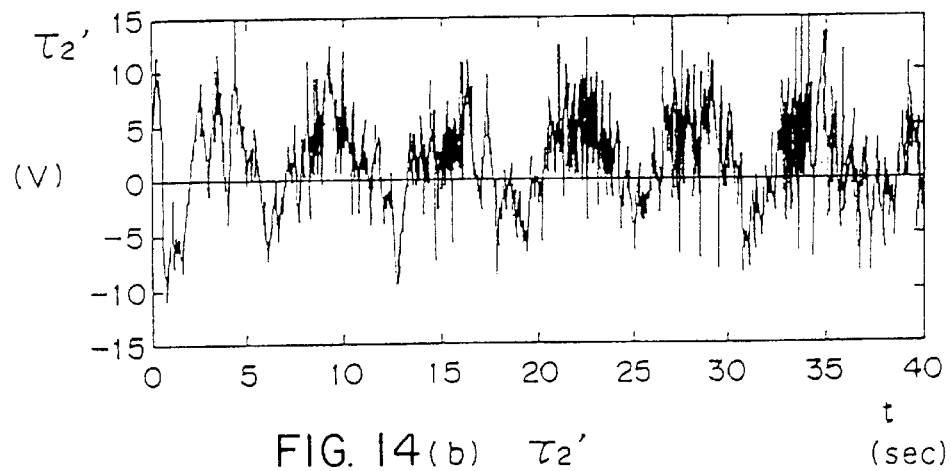
FIG. 14(b) $\tau_2{}'$

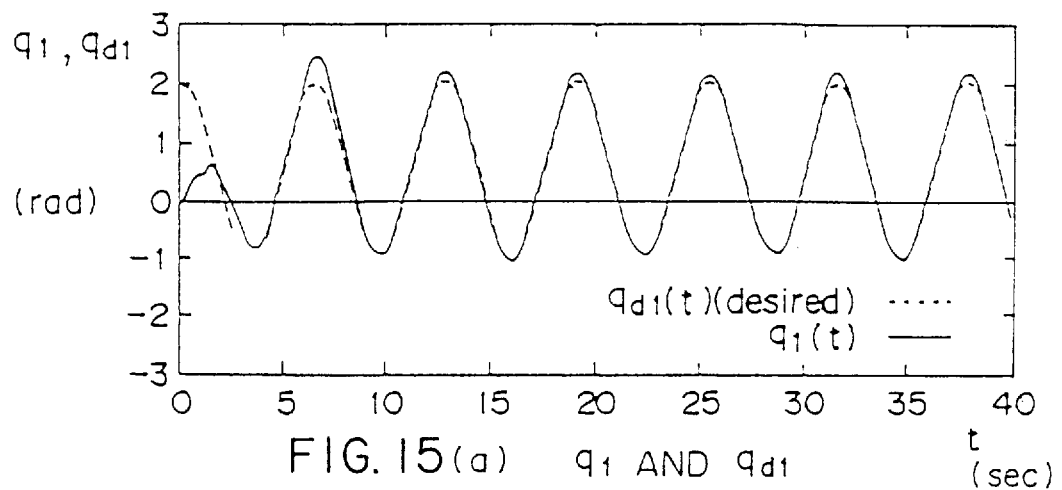
FIG. 15(a)  $q_1$ AND $q_{d1}$
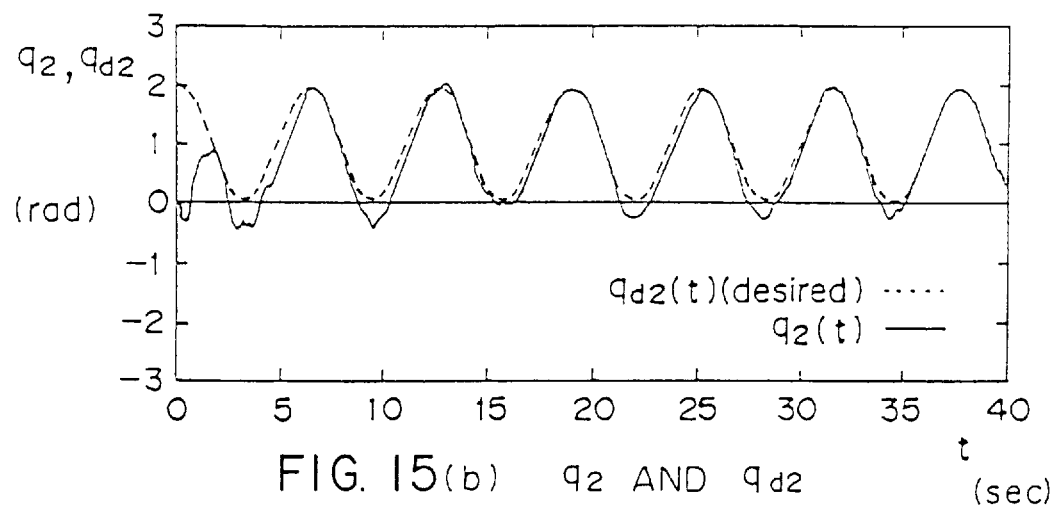
FIG. 15(b)  $q_2$ AND $q_{d2}$

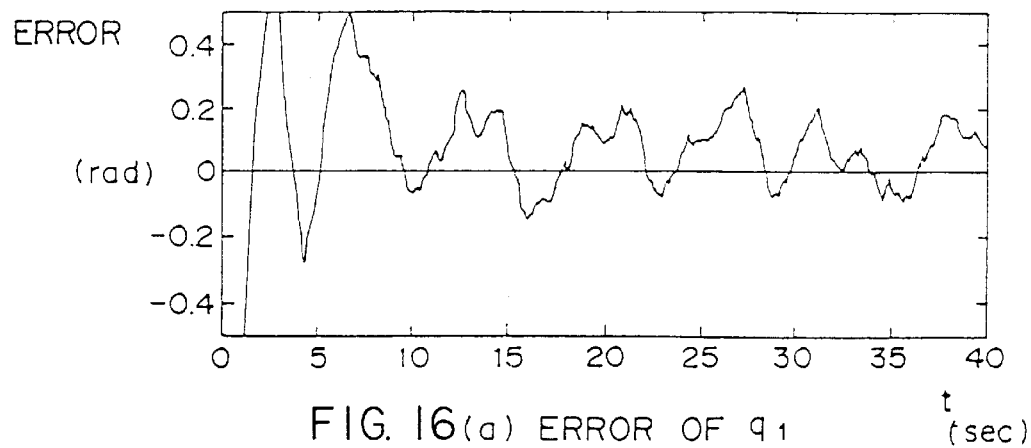
FIG. 16(a) ERROR OF $q_1$
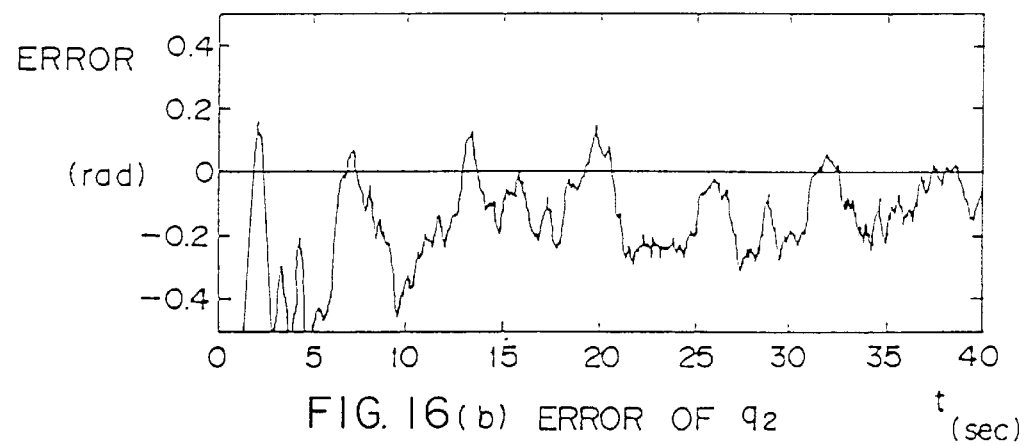
FIG. 16(b) ERROR OF $q_2$

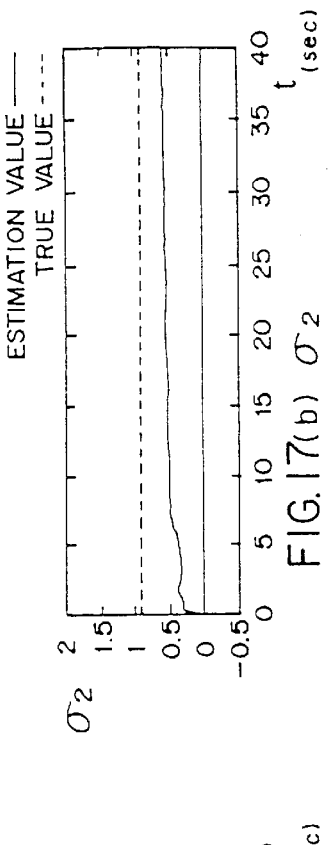
FIG. 17(a) $\sigma_1$
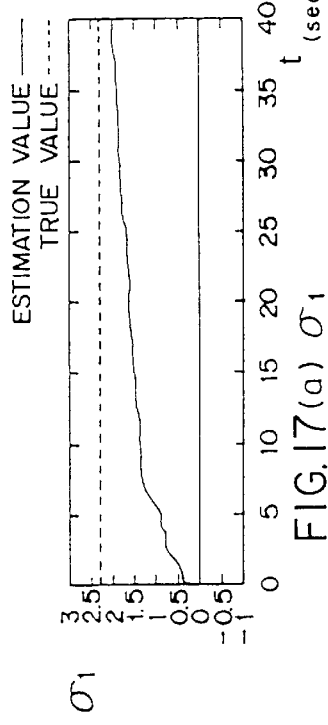
FIG. 17(b) $\sigma_2$
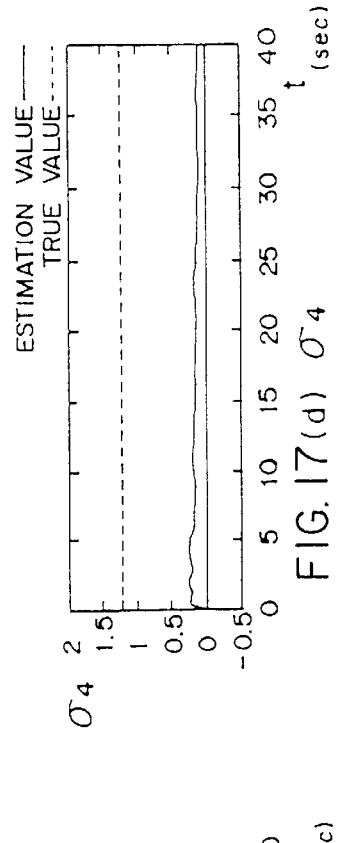
FIG. 17(c) $\sigma_3$
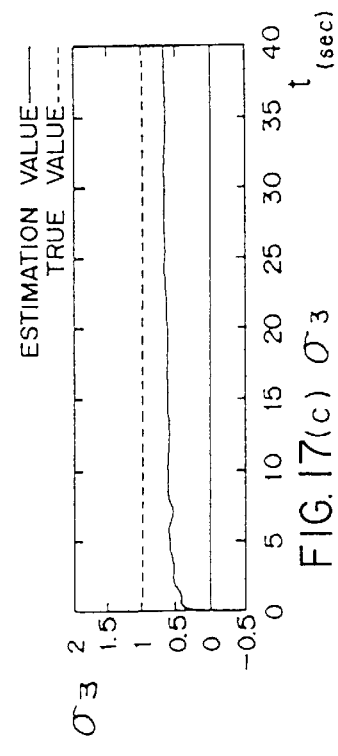
FIG. 17(d) $\sigma_4$
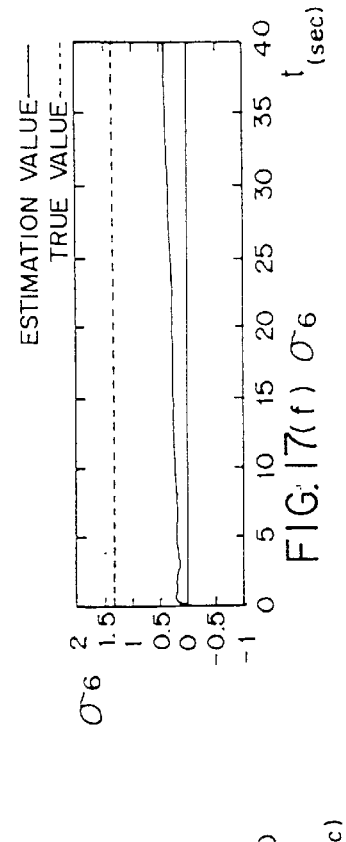
FIG. 17(e) $\sigma_5$
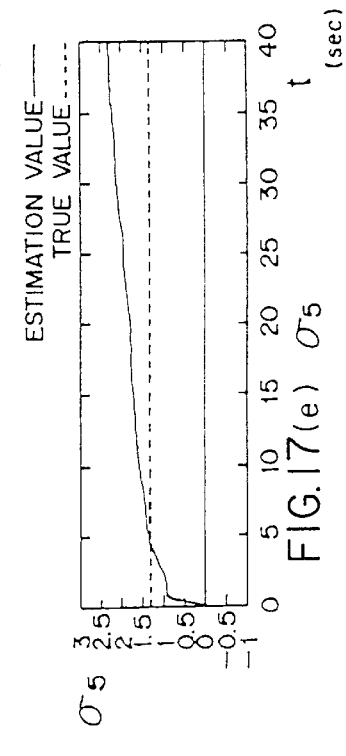
FIG. 17(f) $\sigma_6$

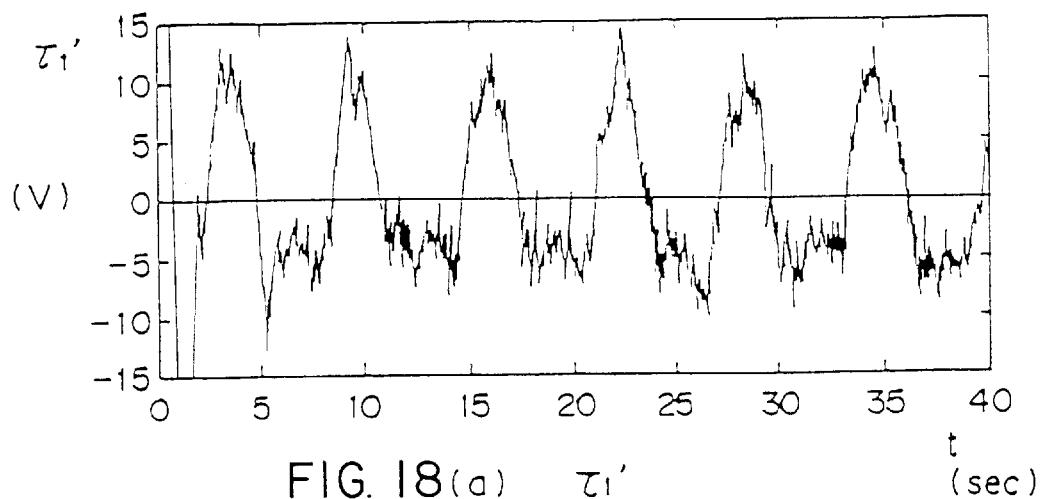
FIG. 18(a)  $\tau_1'$
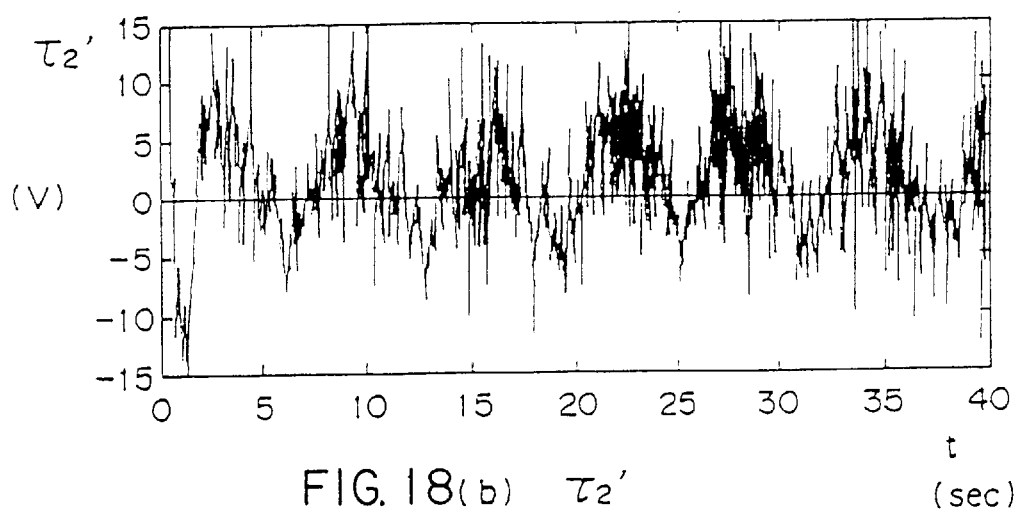
FIG. 18(b)  $\tau_2'$

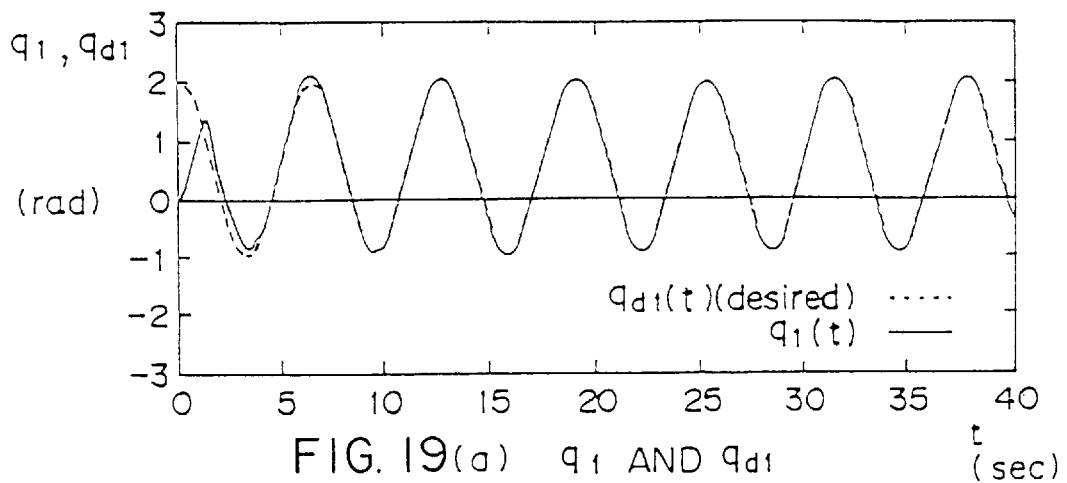
FIG. 19(a)   $q_1$ AND $q_{d1}$
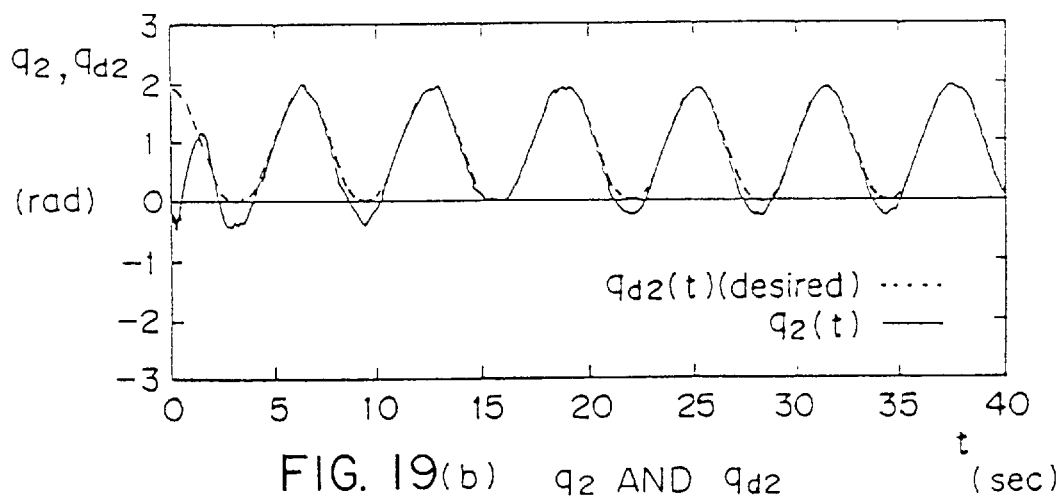
FIG. 19(b)   $q_2$ AND $q_{d2}$

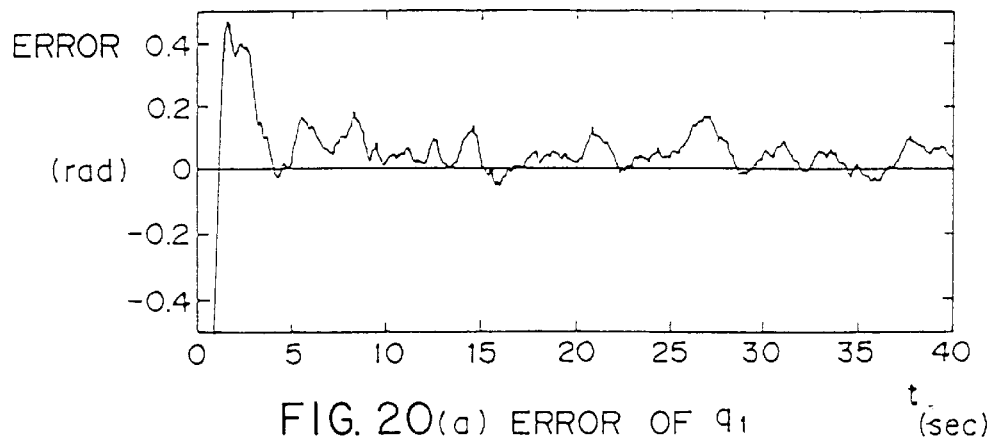
FIG. 20(a) ERROR OF $q_1$
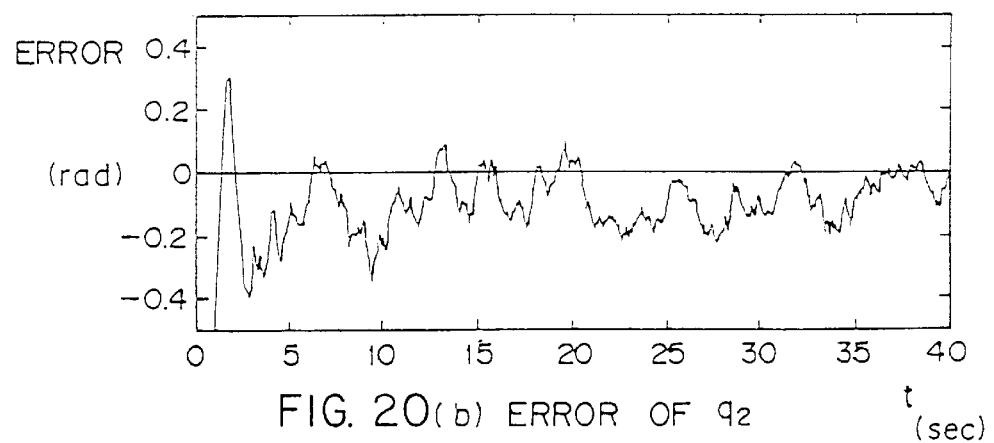
FIG. 20(b) ERROR OF $q_2$

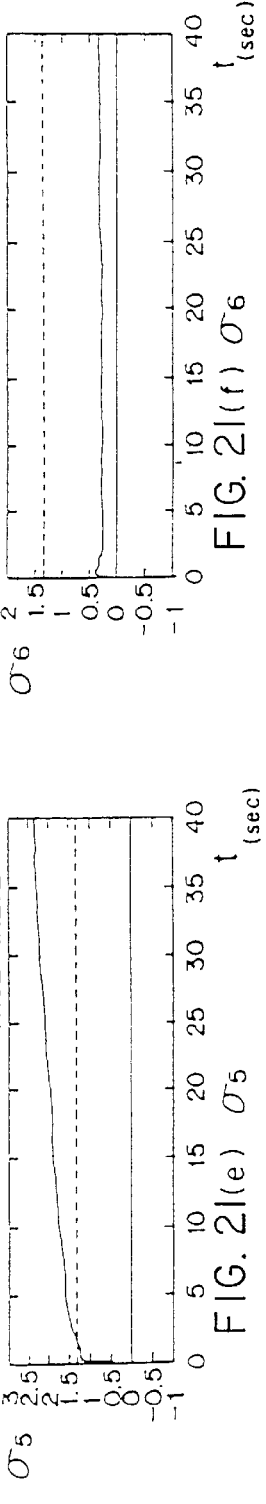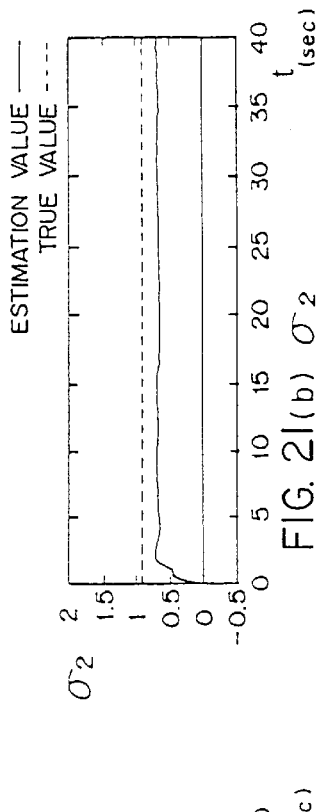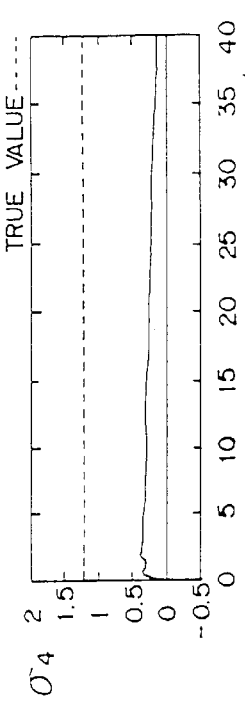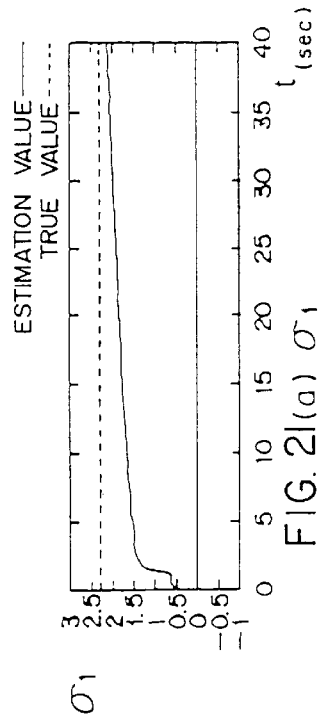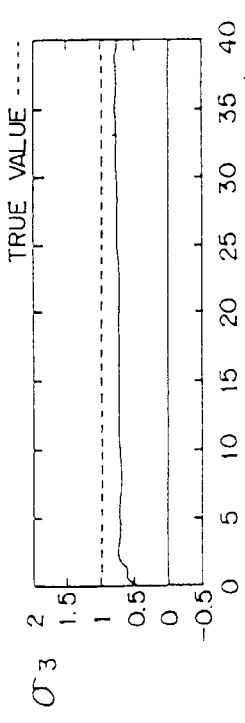

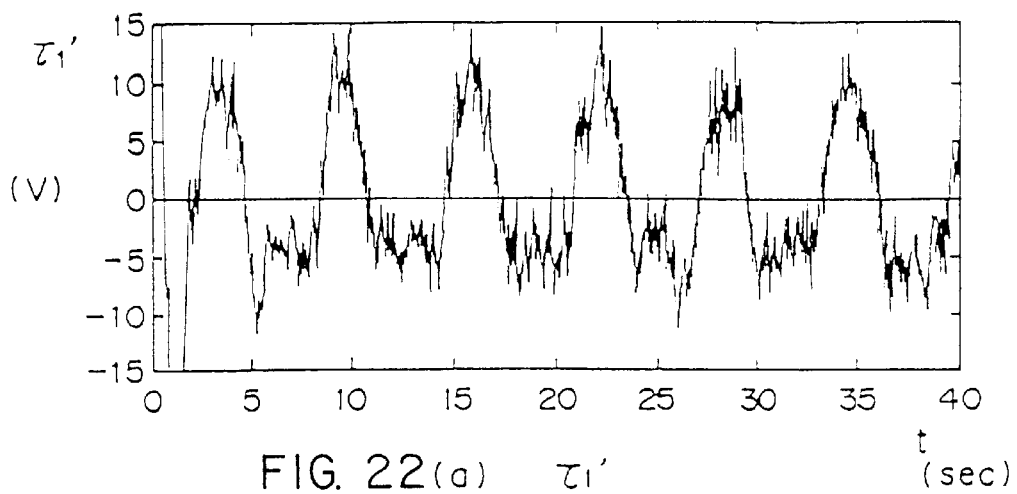
FIG. 22(a) $\tau_1'$
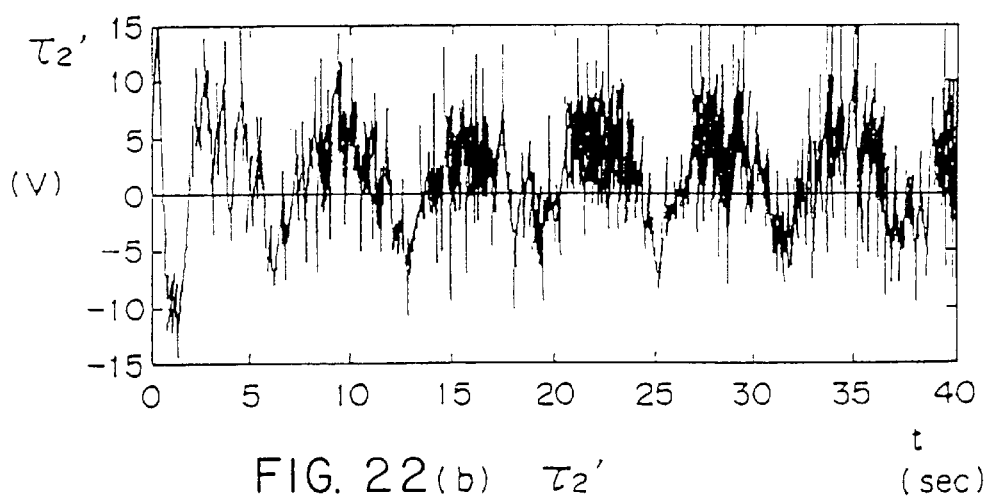
FIG. 22(b) $\tau_2'$

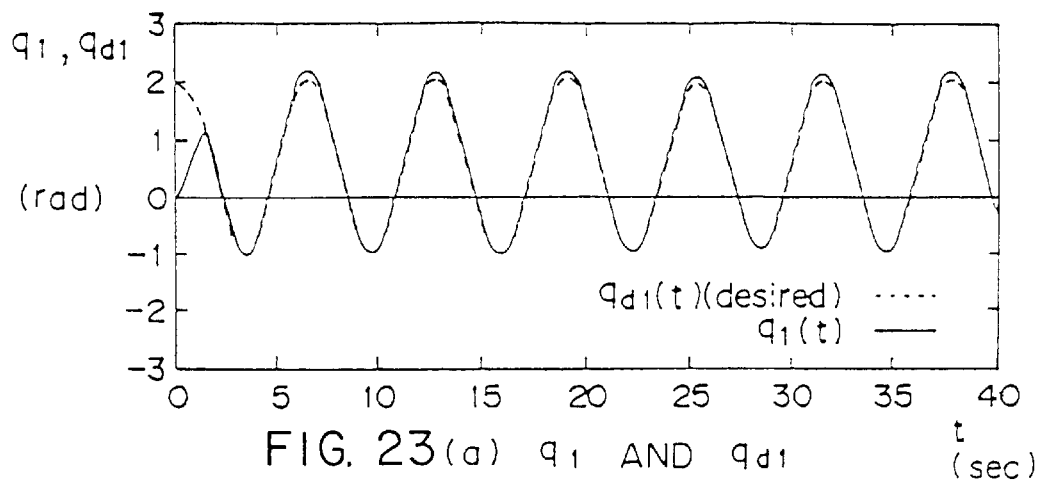
FIG. 23(a) $q_1$ AND $q_{d1}$
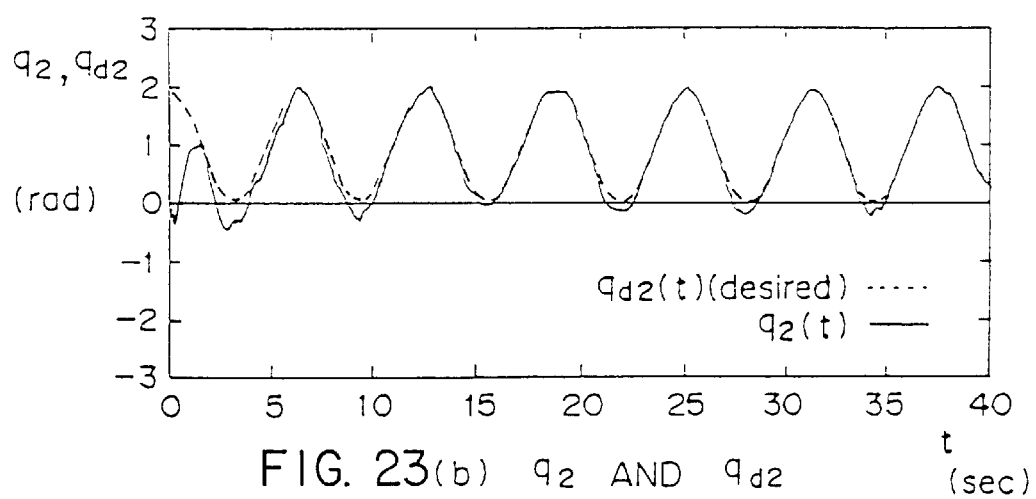
FIG. 23(b) $q_2$ AND $q_{d2}$

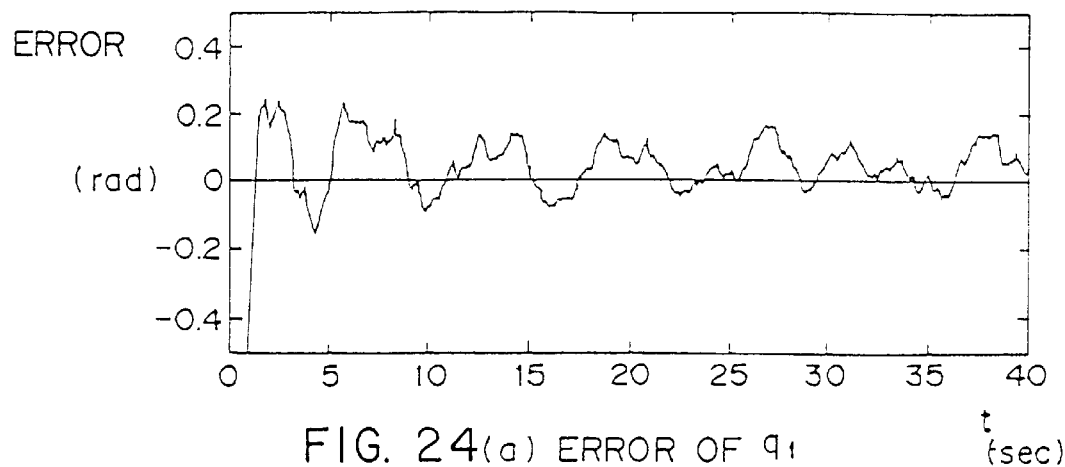
FIG. 24(a) ERROR OF $q_1$
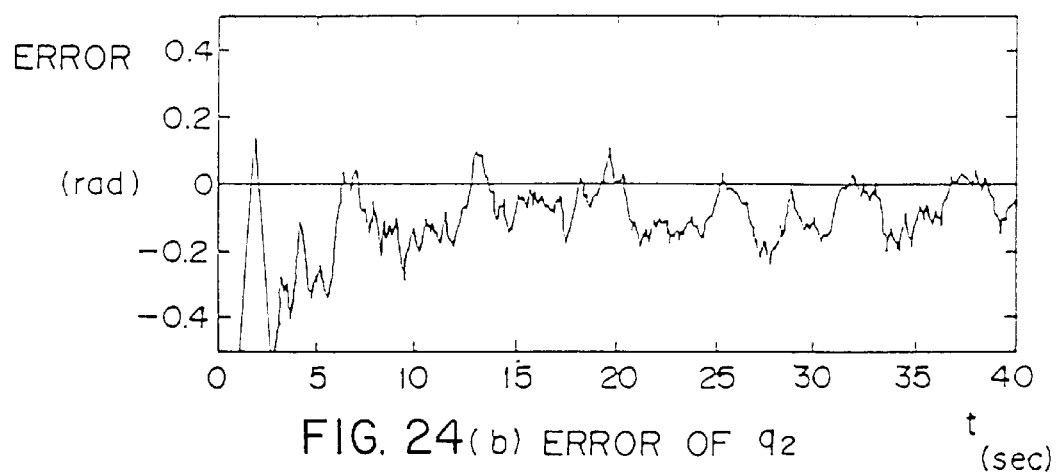
FIG. 24(b) ERROR OF $q_2$

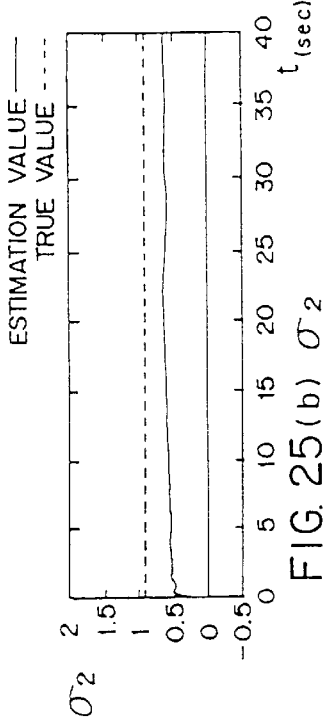
FIG. 25(a) σ₁
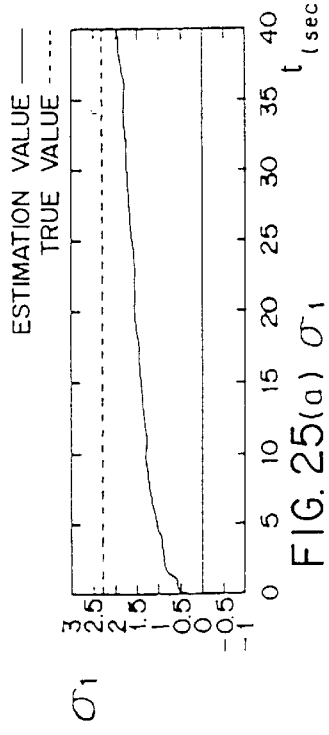
FIG. 25(b) σ₂
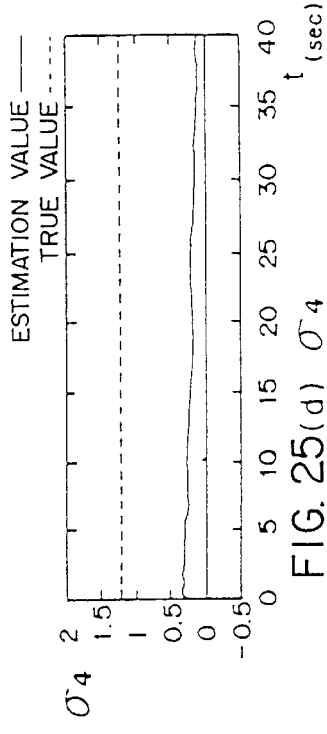
FIG. 25(c) σ₃
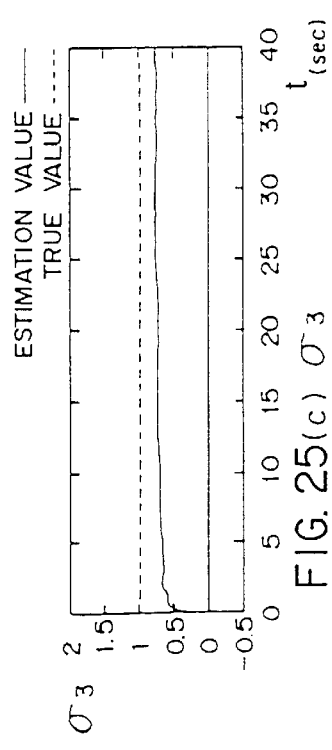
FIG. 25(d) σ₄
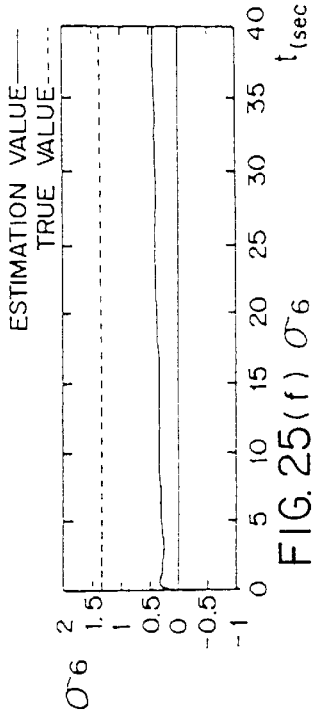
FIG. 25(e) σ₅
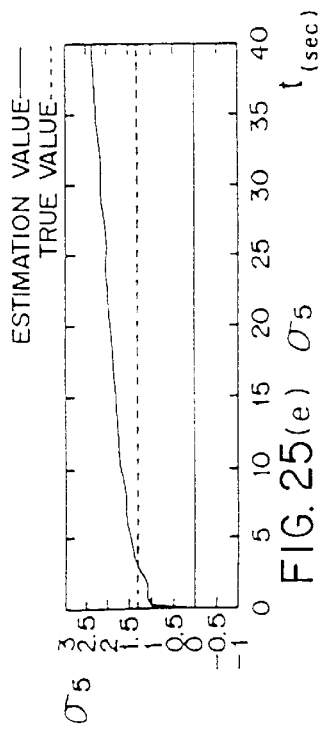
FIG. 25(f) σ₆

ADAPTIVE ROBUST CONTROL DEVICE

BACKGROUND OF THE INVENTION

1. Field of the Invention

The present invention relates to a system control device, especially to a control device for instructing a robot manipulator to track an object trajectory, and more specifically to an adaptive robust control device for guaranteeing an excellent trajectory tracking capability even if a physical parameter characterizing the dynamic behavior is unknown or even if a random disturbance such as a sensor noise is applied.

2. Description of the Related Art

In the trajectory tracking control of an n-link-structured robot manipulator, the dynamic characteristics of a robot manipulator is described using a mathematical model of the following equation in, for example, document 1 titled "Introduction to Robotics: Mechanics and Control," by J. J. Craig published in 1989 by Addison-Wesley, $$M(q)\ddot{q}+C(q,\dot{q})\dot{q}+G(q)=\tau_1 \quad (1)$$

where q indicates an n-dimensional joint variable, and $\dot{q}$ indicates the time differential (d/dt) of q. In equation (1) as a model, M(q) indicates an inertia matrix. $C(q, \dot{q})\dot{q}$ is an n-dimensional vector and describes the influence of the Coriolis force and the centrifugal force. G(q) is an n-dimensional vector representing the influence of gravity. τ is an n-dimensional vector representing the input torque applied from the actuators. The purpose of the trajectory tracking control is to generate the control torque τ that allows the trajectory q(t) of the robot manipulator to follow a desired trajectory $q_d(t)$.

The typical conventional technologies relating to the robot trajectory tracking control are listed below. The first related art is the linear feedback control device. This control device is described in the above described document 1. In this device, an independent position and speed feedback loop is designed for each joint. The object trajectory of each joint is given as a reference input for the control.

This control device is effective for a robot which is provided with a reducer having a large reduction ratio between the actuator and the arm in the mechanism of the robot, and acts at a relatively low speed. However, it is difficult to apply this control device when an operation should be performed at a high speed with high-precision or to a robot having a direct drive mechanism widely applicable to the fields other than the FA (Factory Automation).

The second related art is the computed torque control device. This control device is also described in document 1. It comprises a linear unit and a servo-compensation unit, and its input torque is designed as expressed by the following equation.

$$\tau(t)=C(q,\dot{q})\dot{q}+G(q)+M(q)\{\ddot{q}_d+K_v(\dot{q}_d-\dot{q})+K_p(q_d-q)\} \quad (2)$$

where q, M(q), C(q, $\dot{q}$), and G(q) indicate vectors and matrices in equation (1), and $q_d$ indicates an object trajectory. $K_p$ and $K_v$ indicate constant matrices prescribing the servo-compensation gain. In equation (2), the first and second terms of the right-hand-side are input units for linearization while the remaining units perform servo-compensation. The trajectory tracking error $e=q-q_d$ follows the linear equation expressed below by inputting equation (2) representing the control torque to the robot system expressed by equation (1).

$$\ddot{e}(t)+K_v\dot{e}(t)+K_pe(t)=0, \quad (3)$$

Therefore, a desired servo-compensation characteristic can be obtained by appropriately selecting matrices $K_p$ and $K_v$.

The computation torque control device is based on the premise that the parameters in the coefficient matrix M(q), C(q, $\dot{q}$) G(q) in equation (1) are completely known. However, since the robot is a structure made of a large number of units, it is often troublesome to correctly identify these parameters. The adaptive control device described below has been developed to track an object trajectory with asymptotic stability even in the above described case.

The third related art is the adaptive control device according to document 2 "Applied Nonlinear Control" by J. E. Slotine and W. Li, published in 1991 by Prentice-Hall.

Normally, equation (1) as a dynamic characteristic model of a manipulator can be expressed as follows.

$$M(q)\ddot{q}+\left(\frac{1}{2}\dot{M}(q)+S(q,\dot{q})\right)\dot{q}+G(q)=\tau_1 \quad (4)$$

where matrix $S(q, \dot{q})$ satisfies the following equation (5).

$$S(q,\dot{q})+S^T(q,\dot{q})=0 \quad (5)$$

where $S^T(q, \dot{q})$ indicates the transpose of $S(q, \dot{q})$. As shown in equation (1), the dynamic characteristic model is a non-linear equation if it relates to a joint angle, but is a linear equation if it relates to a parameter obtained by appropriately combining physical parameters (center of mass, center of inertia, etc.). The combined vector is expressed as $\sigma \in R^m$.

The following variable is introduced for a tracking error to obtain a control input which guarantees an asymptotic stability of the control system described by the above dynamic characteristic model $$s(t) = \dot{q}(t) - \dot{q}_r(t) \quad (6)$$

$$= \dot{q}(t) - \dot{q}_d(t) + \Lambda(q(t) - q_d(t))$$

where $q_d$ indicates an object trajectory as in equation (2), and Λ indicates an optional positive definite n×n matrix. The following equation is used as a candidate for a Lyapuov functional in a trajectory tracking control system.

$$V(t) = \frac{1}{2}s^T M(q)s + \frac{1}{2}\tilde{\sigma}^T \Gamma \tilde{\sigma} \quad (7)$$

where Γ indicates an optional positive definite m×m matrix, and σ indicates an estimation error expressed as follows.

$$\tilde{\sigma}(t)=\hat{\sigma}(t)-\sigma \quad (8)$$

where $\hat{\sigma}$ indicates an estimated value of σ.

To guarantee the asymptotic stability, the control input should be set with $\dot{V}(t)<0$. However, the adaptive control device generates the following input by considering the relations expressed in equations (4) and (5), and the linearity of the dynamic characteristic relating to the system parameter.

$$\tau(t)=Y(q,\dot{q},\dot{q}_r,\ddot{q}_r)\hat{\sigma}(t)-K_Ds(t) \quad (9)$$

where $q_r$ indicates a variable defined by equation (6). The first term of the right-hand-side in equation (9) indicates the feed-forward component using an estimated value. Assuming that the estimated values of the coefficient matrices $\hat{M}(q)$, $\hat{C}(q, \dot{q})$, and $\hat{G}(q)$ are $M(q)$, $C(q, \dot{q})$, and $G(q)$ respectively in equation (1), the first term of the right-hand-side in equation (9) is expressed as follows, $$Y(q,\dot{q},\dot{q}_r,\ddot{q}_r)\hat{\sigma}(t)=\hat{M}(q)\ddot{q}_r(t)+\hat{C}(q,\dot{q})\dot{q}_r(t)+\hat{G}(q). \quad (10)$$

Matrices $\hat{M}(q)$, $\hat{C}(q, \dot{q})$, and $\hat{G}(q)$ are expressed by the estimated value $\hat{\sigma}$ of a system parameter, but the estimated value is updated by the following adaptation law.

$$\dot{\hat{\sigma}} = -\Gamma^{-1}Y^T(q, \dot{q}, \dot{q}_r, \ddot{q}_r)s(t), \quad (11)$$

where $K_D$ in the second term of the right-hand-side indicates an optional positive definite n×n matrix.

FIG. 1 is a block diagram showing the configuration of the conventional adaptive control device.

In FIG. 1, the adaptive control device comprises a trajectory tracking error operation unit 51 for obtaining a trajectory tracking error based on the actual trajectory and an object trajectory of a robot 50; a parameter updating unit 52 for updating the estimated value of a system parameter according to equation (11) as a parameter adaptation law; an adaptive linearization input generation unit 53 for generating a partial input in equation (10) as a partial input for adaptive linearization of a system; a feedback gain multiplication unit 54 for generating a partial input in the second term of the right-hand-side in equation (9); and a subtractor 55 for subtracting an output from the feedback gain multiplication unit 54 from the output from the adaptive linearization input generation unit 53 and providing the subtraction result for the robot 50 as an input.

As shown in equations (9) through (11), an adaptation law on a system parameter is incorporated into the adaptive control device to correspond to an incorrect system parameter. Based on the estimated value obtained from the adaptation law, the adaptive control device performs a nonlinear compensation, and simultaneously performs an error PD feedback. Thus, the adaptive control device realizes a trajectory tracking with asymptotic stability even if the system parameter is not correctly estimated.

If the following equation (12) is substituted into equation (9), the control input is expressed as follows in equation (13).

$$K_D=\hat{M}(q)\Lambda \quad (12)$$

$$\tau(t)=\hat{C}(q,\dot{q})\dot{q}_r+\hat{G}(q)+\hat{M}(q)\{\ddot{q}_d+2\Lambda(\dot{q}_d-\dot{q})+\Lambda^2(q_d-q)\} \quad (13)$$

Thus, the input is similar to that with the computed torque control device. Since the positive definiteness of $\hat{M}(q)$ is not guaranteed, a system parameter to be estimated is extracted from the relation expressed by the following equation (14) to select $K_D$ as shown in the equation (12) and guarantee the asymptotic stability. Then, the adaptation law on them should be amended as shown by the following equation (15).

$$Y_m(q,\dot{q},\dot{q}_r,\ddot{q}_r)\hat{\sigma}(t)=\hat{M}(q)(\ddot{q}_r(t)-\Lambda s(t))+\hat{C}(q,\dot{q})\dot{q}_r(t)+\hat{G}(q) \quad (14)$$

$$\dot{\hat{\sigma}} = -\Gamma^{-1}Y_m^T(q, \dot{q}, \dot{q}_r, \ddot{q}_r)s(t) \quad (15)$$

At this time, the generated input is expressed by equation (13), but can also be expressed as follows.

$$\tau(t)=Y_m(q,\dot{q},\dot{q}_r,\ddot{q}_r)\hat{\sigma}(t) \quad (16)$$

As shown in equation (13), the adaptive control device can also generate an input similar to that generated by the computed torque control device. However, unlike the computed torque control device, it cannot freely provide a desired servo-compensation characteristic, or cannot appropriately remove the influence of random disturbance such as irregular external forces or noise from the environment, etc.

A robot is a structure made of a number of materials, and it is troublesome to correctly estimate the coefficient matrices $M(q)$, $C(q, \dot{q})$, and $G(q)$ in equation (1) as a dynamic characteristic model. Because of the influence of random disturbance such as noise, a robot often fails to obtain a desired performance.

On the other hand, most conventional technologies are based on the premise that the coefficient matrix of a dynamic characteristic model is correctly given. A parameter adaptation law may be incorporated into some conventional technologies in consideration of the error in a model or of an influence of an external input whose size is defined. However, very few conventional technologies have successfully developed a robust control device with a modelling error and the influence of random disturbance such as noise taken into account. Actually, there is only the technology described in the following document 3 by the Inventor, that is, "A robust motion control of manipulators with parametric uncertainties and random disturbances" in Proc. of 34th IEEE Conf. Decision and Control, page 1609 through 1611, 1995.

SUMMARY OF THE INVENTION

The present invention provides a control device having a robust characteristic which solves the problem of an incorrect parameter with the conventional computed torque control device and the above described problem about the influence of the disturbance with the conventional adaptive control device. That is, the present invention aims at providing a system such as an adaptive robust control device for allowing a robot to track an object trajectory that operates under undesirable conditions of, for example, an unknown physical parameter featuring the dynamic characteristic, random disturbances such as sensor noise, etc.

The adaptive robust control device according to the present invention comprises as basic components to realize the above described purpose a parameter estimation unit, an adaptive linearization input generation unit, and a robustness partial input generation unit.

The parameter estimation unit estimates a physical parameter of a system, for example, updates the estimated value of the physical parameter of the system on each sampling cycle.

The adaptive linearization input generation unit generates a partial input to perform an adaptive linearization compensation on the system based on an estimation result from the parameter estimation unit. For example, it generates a partial input to linearizing the system based on the parameter estimation value updated on each sampling cycle and the trajectory tracking error of the system.

The robustness partial input generation unit generates a partial input to improve the robustness of the system linearized by the adaptive linearization unit. It generates a partial input based on the output from the robustness compensator designed corresponding to, for example, control specification, the above described estimation value of a parameter, etc.

According to the present invention, an adder adds up the partial input, for use in adaptive linearization compensation, generated by the adaptive linearization input generation unit and the partial unit, for use in the improvement of the robustness of the system, generated by the robustness partial input generation unit. The sum is applied to a system, for example, as an input voltage to the actuator of a robot, thereby appropriately controlling the system.

According to the present invention, the general specification refers to the reduction of the influence of the modelling error of the system (improvement in trajectory tracking) and the minimization of the influence of random disturbances as the specification of the robustness of the system. A robustness compensator designed based on the mixed $H_2$ and $H_\infty$ control theory is used to realize the specification of the robustness.

Thus, according to the present invention, the robustness of a system can be improved even if the physical parameter of the system cannot be completely estimated.

BRIEF DESCRIPTION OF THE DRAWINGS

FIG. 9 shows the value of the parameter in simulation;

FIG. 10 shows the input voltage ($H_2/H_\infty$ partial input) to the actuator generated by the adaptive robust control device;

FIG. 11 shows the trajectory (solid lines) of each joint angle and the object trajectory (broken lines) for the input voltage shown in FIG. 10;

FIG. 12 shows the trajectory error of each joint angle for the input voltage shown in FIG. 10;

FIG. 13 shows an estimation result of the parameter for the input voltage shown in FIG. 10;

FIG. 14 shows the input voltage to the actuator generated by the conventional adaptive control device;

FIG. 15 shows the trajectory (solid lines) of each joint angle and the object trajectory (broken lines) for the input voltage shown in FIG. 14;

FIG. 16 shows the trajectory tracking error for the input voltage shown in FIG. 14;

FIG. 17 shows the estimation result of the parameter for the input voltage shown in FIG. 14;

FIG. 18 shows the input voltage ($H_2$ partial input) to the actuator generated by the adaptive robust control device;

FIG. 19 shows the trajectory (solid lines) of each joint angle and the object trajectory (broken lines) for the input voltage shown in FIG. 18;

FIG. 20 shows the trajectory error of each joint angle for the input voltage shown in FIG. 18;

FIG. 21 shows the estimation result of the parameter for the input voltage shown in FIG. 18;

FIG. 22 shows the input voltage ($H_\infty$ partial input) to the actuator generated by the adaptive robust control device;

FIG. 23 shows the trajectory (solid lines) of each joint angle and the object trajectory (broken lines) for the input voltage shown in FIG. 22;

FIG. 24 shows the trajectory error of each joint angle for the input voltage shown in FIG. 22;

FIG. 25 shows the estimation result of the parameter for the input voltage shown in FIG. 22.

DESCRIPTION OF THE PREFERRED EMBODIMENTS

Figure 1:
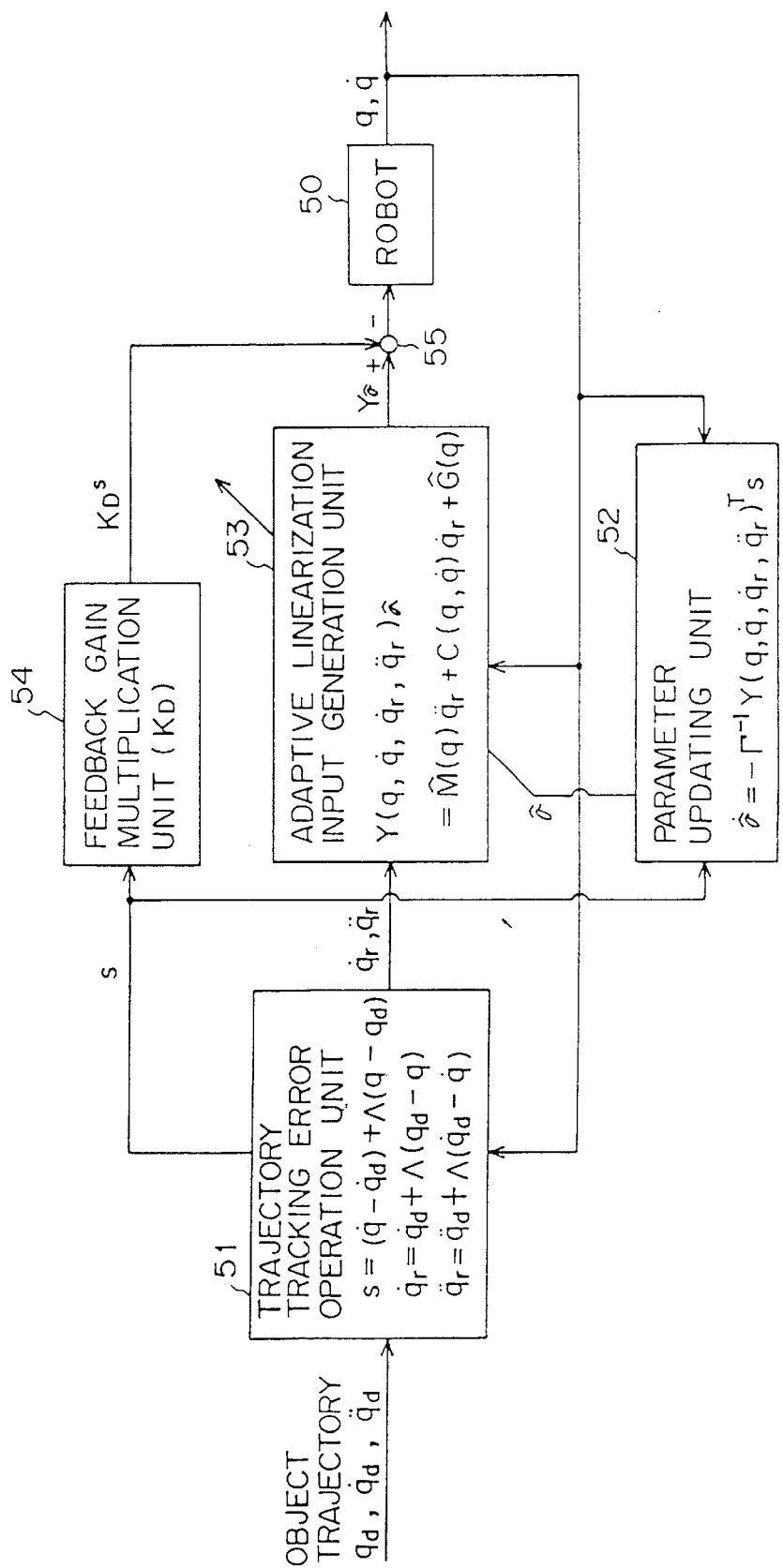
FIG. 1 is a block diagram showing the configuration of the conventional adaptive control device.
Figure 2A:
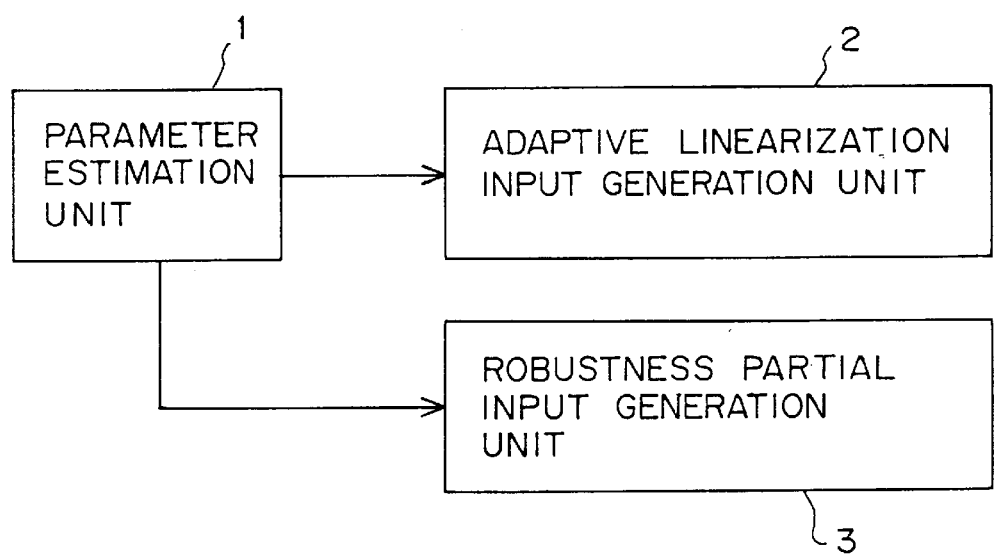
FIG. 2A is a block diagram showing the principle of the present invention.

FIG. 2A is a block diagram showing the principle of the present invention. In detail, FIG. 2A is a block diagram showing the principle of the adaptive robust control device for allowing a system to track an object trajectory under such conditions that the physical parameter of the system featuring the dynamic characteristic is unknown and a random disturbance is applied to the system.

In FIG. 2A, a parameter estimation unit 1 estimates the physical parameter of a system, and can be a parameter estimation value update unit for updating the estimated value of the physical parameter of the system on each sampling cycle.

An adaptive linearization input generation unit 2 generates a partial input for use in adaptive linearization compensation on the system based on the estimation result of the parameter estimation unit 1. It can be, for example, an adaptive linearization input generation unit for generating a partial input to linearize a system based on the parameter estimation value updated by the parameter estimation value update unit on each sampling cycle, and based on the trajectory error of the system.

A robustness partial input generation unit 3 generates a partial input to improve the robustness of the system linearized by the adaptive linearization input generation unit 2. It can be, for example, a robustness partial input generation unit for generating a partial input based on the output from the robustness compensator designed according to the control specification and based on the parameter estimation value as an output from the above described parameter estimation value update unit.

An adder adds up the partial input, for use in adaptive linearization compensation, generated by the adaptive linearization input generation unit 2 and the partial unit, for use in the improvement of the robustness of the system, generated by the robustness partial input generation unit 3. The sum is applied to a system, for example, as an input voltage to the actuator of a robot, thereby appropriately controlling the robot. Thus, the robustness of the system can be improved even if the physical parameter cannot be completely estimated.

According to the present invention, control is performed based on the premise that the physical parameter featuring the dynamic characteristic of the system is unknown and that random disturbance such as sensor noise is applied to the system.

The first premise that the physical parameter is unknown is based on the complicated system and structure of a robot which is a movable machine comprising a number of elements. This is quite obvious from an example of a robot having 2 degrees of freedom (2DOF) as the simplest possible robot. Most of modelling objects including robots are complicated beyond the simple descriptions based on physics and include uncertain elements that cannot be correctly identified. That is, a robot functions while constantly exchanging material and energy with the environment, and is subject to the changes through the passage of time and to the influences of unexpected changes in the environment. Therefore, it is very difficult to completely identify the features and the movements of a robot as a machine.

The second premise that random disturbance is applied is set in consideration of undesirable noise occurring when a control signal is transmitted from the control device to the actuator of the robot depending on the environment of the robot, and in consideration of the phenomenon of the noise in the control device occurring because it is difficult to perform a numerical process with acceptable precision when the information from the sensor is fed back.

An adaptive control device including a parameter estimating mechanism is used to obtain an acceptable trajectory tracking capability under the two above described premises. Within the scope of the prior art technology, no effective counteractions can be taken against the problem of the robustness of the control system when no parameters can be correctly estimated or against the problem of random disturbance as the above described second premise.

To solve these problems, the control device according to the present invention comprises in principle the components the parameter estimation unit 1 having the function of estimating a parameter; the adaptive linearization input generation unit 2 having the function of adaptively linearity-compensating a system depending on the parameter estimation result; and the robustness partial input generation unit 3 having the function of robustness-compensating the linearized system.

When a parameter of the linearizing system cannot be successfully estimated, it is considered that a modelling error is contained as disturbance, and a random disturbance is contained as the second premise. To process the disturbance, the robustness partial input generation unit 3 is implemented to make the linearized system robust.

According to the present invention, the general specification refers to the reduction of the influence of the modelling error of the system (improvement in trajectory tracking) and the minimization of the influence of random disturbance as the specification of the robustness of the system. A robustness compensator designed based on the mixed $H_2$ and $H_\infty$ control theory is used to realize the specification of the robustness.

When the specification of the robustness is limited to the reduction of the influence of the modelling error of a system, a robustness compensator designed based on the $H_\infty$ control theory is used. When the specification of the robustness is limited to the minimization of the influence of the random disturbance, a robustness compensator designed based on the $H_2$ control theory is used.

Since the purpose of the present invention is attained by a partial input as a part of the control input to a robot according to the present invention, the method of generating the partial input is described first before explaining the embodiment in detail.

First, the control input is given as follows according to the present invention.

$$\tau(t)=\hat{C}(q,\dot{q})\dot{q}_r+\hat{G}(q)+\hat{M}(q)(\ddot{q}_d+2\Lambda(\dot{q}_d-\dot{q})+\Lambda^2(q_d-q)+u) \quad (17)$$

Equation (17) as an input is expressed as equation (13) as an input generated by an adaptive control device and provided with the term of the partial input u(t). The partial input improves the trajectory tracking capability and removes the random disturbance.

When the input of equation (17) is applied, the trajectory tracking error e is expressed by the following state equation.

$$\ddot{e}(t)+2\Lambda\dot{e}(t)+\Lambda^2 e(t)=u(t)+\bar{B}_0 w_0(t)+\bar{B}_1 w_1(t) \quad (18)$$

where $e(t)=q(t)-q_d(t)$, $w_0(t)$ indicates a bounded deterministic term indicating the disturbance by the estimation error of a system parameter, and $w_1(t)$ indicates a stochastic term indicating the random disturbance such as noise. $\bar{B}_0$ and $\bar{B}_1$ are matrices of appropriate sizes indicating the characteristics of the disturbances of respective types. At this time, equation (18) indicating the dynamic characteristic of a tracking error can be converted into the following standard form.

$$\dot{x}(t)=Ax(t)+B_0 w_0(t)+B_1 w_1(t)+B_2 u(t). \quad (19)$$

However, the matrix and vector in equation (19) are defined as follows.

$$x(t)=\begin{bmatrix} e \\ \dot{e} \end{bmatrix}=\begin{bmatrix} q(t)-q_d(t) \\ \dot{q}(t)-\dot{q}_d(t) \end{bmatrix} \quad (20)$$

$$A=\begin{bmatrix} 0 & I \\ -\Lambda^2 & -2\Lambda \end{bmatrix}, B_0=\begin{bmatrix} 0 \\ \bar{B}_0 \end{bmatrix}, B_1=\begin{bmatrix} 0 \\ \bar{B}_1 \end{bmatrix}, B_2=\begin{bmatrix} 0 \\ I \end{bmatrix} \quad (21)$$

The problem is how the partial input u in equation (17) can be generated.

To capture the control performance, the amount of any feature z(t) should be observed. This amount is generally expressed as follows.

$$z(t)=C_1 x(t)+D_{12} u(t) \quad (22)$$

where z(t), $C_1$, and $D_{12}$ indicate a matrix and vector of approximate dimensions.

Examples of z(t), $C_1$, and $D_{12}$ in equation (22) are:

$$z(t)=\begin{bmatrix} Q^{1/2} x(t) \\ R^{1/2} u(t) \end{bmatrix}, C_1=\begin{bmatrix} Q^{1/2} \\ 0 \end{bmatrix}, D_{12}=\begin{bmatrix} 0 \\ R^{1/2} \end{bmatrix}$$

where $Q \geq 0$, and $R>0$. They correspond to the following control rule for the optimal regulator.

$$J_0(u)=\min_u \lim_{t_f \to \infty} \frac{1}{t_f}\int_0^{t_f}(x(t)^T Qx(t)+u(t)^T Ru(t))dt$$

$$=\min_u \lim_{t_f \to \infty} \frac{1}{t_f}\int_0^{t_f}|z(t)|^2 dt$$

When the control input is configured, the information about the state of the system, etc. is collected using sensors, etc. The observation amount if expressed as follows.

$$y(t)=C_2 x(t)+D_{20} w_0(t)+D_{21} w_1(t) \quad (23)$$

The constant $C_2$ in the first term of the right-hand-side indicates the characteristic of the sensor. The second term indicates the noise by the disturbance caused by the estimation error of the system parameter. The third term indicates the noise by random disturbance.

As described above, the purpose of implementing the partial input u(t) is to improve the trajectory tracking capability and to remove the random disturbance. To realize the first purpose, the influence of the estimation error of the system parameter on the trajectory tracking error should be reduced. To realize the second purpose, the influence of the random disturbance applied to the system on the trajectory tracking error should be minimized.

To improve the trajectory tracking capability, a partial input u(t) satisfying the following equation is generated based on the $H_\infty$ control theory.

$$\|T_{zw0}\|_\infty := \sup_\omega |T_{zw0}(j\omega)| < \gamma \qquad (24)$$

However, $T_{zw0}$ in equation (24) expresses the closed loop transfer function to the amount of the feature z(t) containing the trajectory tracking error from the estimation error $w_0$ of the system parameter. $\gamma$ indicates a constant prescribing the magnitude of the transfer function.

To reject the random disturbance, a partial input u(t) satisfying the following standard is generated based on the $H_2$ control theory.

$$\min_u J(z) \qquad (25)$$

where the functional J(z) in (25) is expressed as $$J(z) = \|T_{zw1}\|_2^2 := \frac{1}{2\pi} \int_{-\infty}^{\infty} |T_{zw1}(j\omega)|^2 d\omega \qquad (26)$$

In (26) $T_{zw1}$ indicates the closed loop transfer function to the amount of the feature z(t) containing the trajectory tracking error from the random disturbance $w_1$.

When it is necessary to simultaneously improve the trajectory tracking capability and reject the random disturbance, the partial input u(t) is generated to simultaneously satisfy equations (26) and (24) based on the mixed $H_2$ and $H_\infty$ control theory.

The above described $H_2$ control theory and $H_\infty$ control theory are described in the following document 4, and the mixed $H_2$ and $H_\infty$ control theory is described in the following document 5.

document 4: "State-Space Solutions to Standard $H_2$ and $H_\infty$ Control Problems" by J. C. Doyle, K. Glover, P. P. Khargonekar and B. A. Francis, IEEE Transactions on Automatic Control, Vol. 34, pp. 831–847, 1989.

document 5: "Mixed $H_2$ and $H_\infty$ Performance Objectives II: Optimal Control" by J. Doyle, K. Zhou, K. Glover, and B. Bondenheimer, IEEE Transactions on Automatic Control, Vol. 39, pp. 1575–1587, 1994.

Figure 2B:
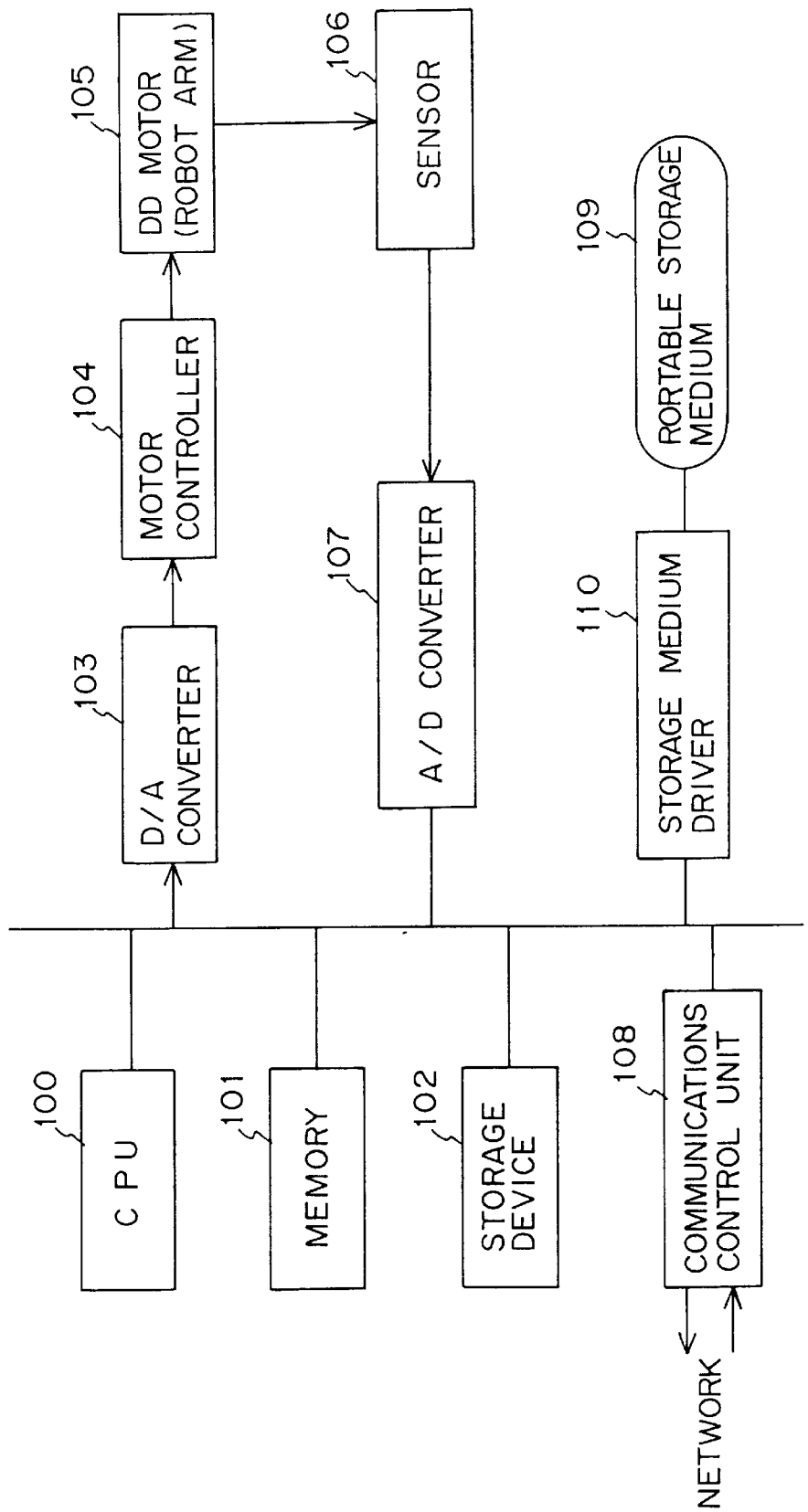
FIG. 2B shows the appearance of the computer to realize the present invention.

FIG. 2B shows the configuration of the system when the adaptive robust control device according to the present invention is realized in a computer environment. In FIG. 2B, the system comprises a CPU 100 for performing an operation required for each process for control; memory 101 such as cache, etc.; a storage device 102, for example, a magnetic disk; a D/A converter 103 for converting an input voltage signal obtained as a sum of a robustness partial input, to be described later, and an adaptive linearization input into an analog signal; a motor controller 104 for controlling a DD motor 105 for driving a robot arm using an output of the D/A converter 103; a sensor 106 for detecting the movement of the DD motor (robot arm) 105 for the trajectory output process, to be described later, etc.; an A/D converter 107 for converting the detection signal from the sensor 106 into a digital signal; a communications control unit 108 for controlling the communications (transfer of a program, etc.) with an external network; and a storage medium driver 110 for driving a portable storage medium 109 such as a floppy disk which stores, for example, the programs of the processes executed according to the present invention.

Figure 3:
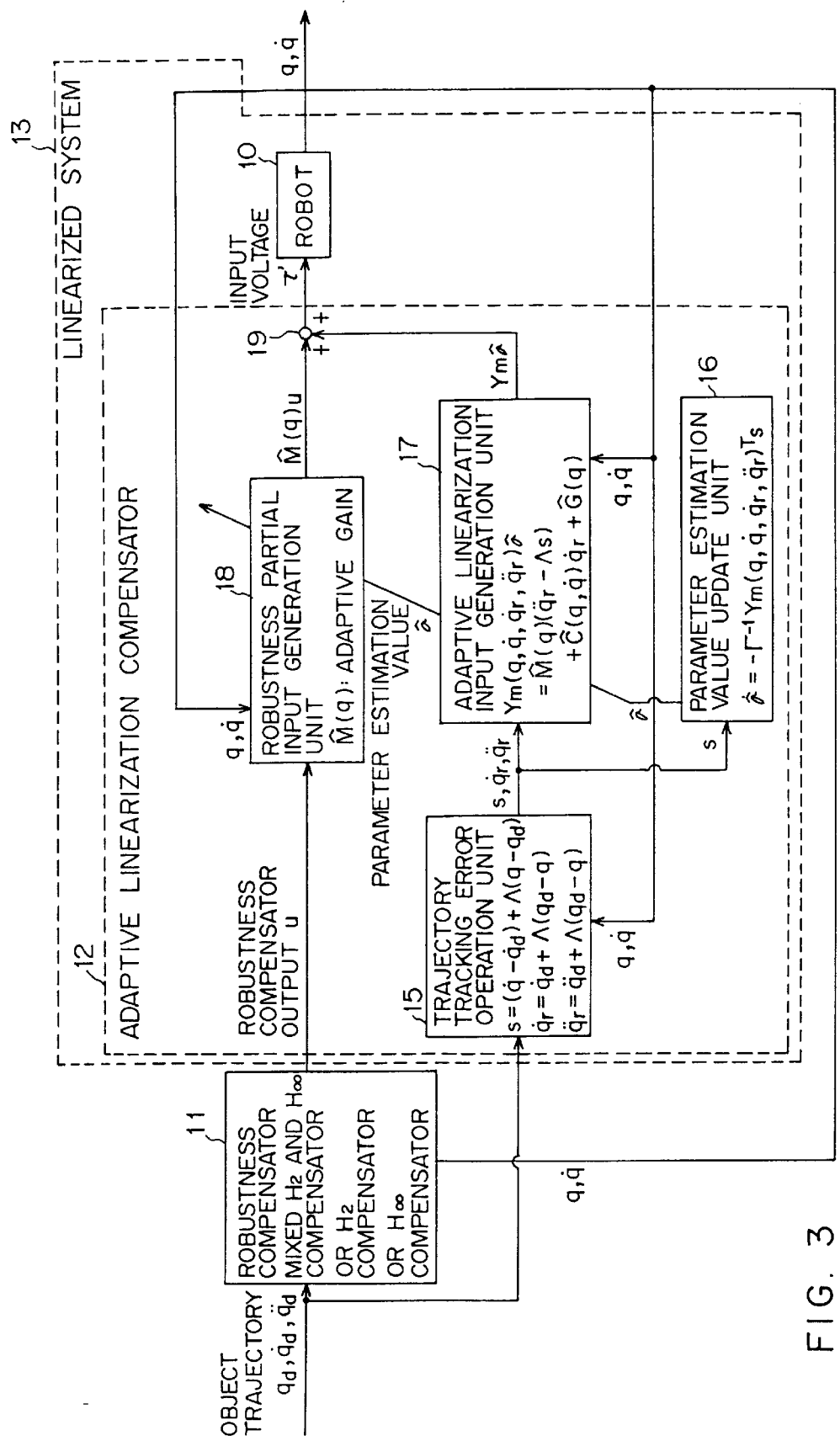
FIG. 3 is a block diagram showing the configuration of the adaptive robust control device according to the present invention.

The embodiment of the present invention is described in detail from the configuration of the control device. FIG. 3 is a block diagram showing the configuration of the adaptive robust control device. In FIG. 3, an adaptive robust control device for a robot 10 comprises a robustness compensator 11 and an adaptive linearization compensator 12. The adaptive linearization compensator 12 and the robot 10 form a linearized system 13.

The robustness compensator 11 generates a compensation element for the robustness of a robot system corresponding to the input of, for example, a user-specified object trajectory and an actual trajectory of a robot.

The object trajectory is given by user specifying the function of the object trajectory of a robot and its initial value. When the function $q_d(t)$ is specified, the time differential $\dot{q}_d(t)$ (speed) and $\ddot{q}_d(t)$ (acceleration) are simultaneously specified. The object trajectory generated online by the specification is provided for the robustness compensator 11 and a trajectory tracking error operation unit 15 described later.

The robustness compensator 11 generates a compensation element for the robustness of the linear system including the disturbance by the parameter estimation error and random disturbance such as noise, etc. The elements are generated through the partial input from an adaptive linearization input generation unit 17 described later based on the object trajectory, an actual trajectory q(t) of the robot, and the time derivative $\dot{q}(t)$.

According to the present invention, the robustness refers to the reduction of the influence of a modelling error and the minimization of the influence of the random disturbance. By realizing these processes, the trajectory tracking capability, and the precision and convergence speed in estimating a parameter can be improved. In this case, the robustness compensator 11 is a mixed $H_2$ and $H_\infty$ compensator designed based on the mixed $H_2$ and $H_\infty$ control theory.

However, when the specification of the robustness is limited to the reduction of the influence of a modelling error, the robustness compensator 11 is designed as an $H_\infty$ compensator based on the $H_\infty$ control theory. When the specification of the robustness is limited to the minimization of the influence of a random disturbance, the robustness compensator 11 is designed as an $H_2$ compensator based on the $H_2$ control theory.

The adaptive linearization compensator 12 comprises the trajectory tracking error operation unit 15 for obtaining a trajectory tracking error of a robot; a parameter estimation value update unit 16 for updating the value of a system parameter at each sampling time; the adaptive linearization input generation unit 17 for generating a partial input for linearizing the dynamics of a robot, a robustness partial input generation unit 18 for generating a partial input which provides a robot with the robustness for the effects of modelling error and random disturbance; and an adder 19 for adding up the output from the adaptive linearization input generation unit 17 and the output from the robustness partial input generation unit 18 and providing an input voltage for the robot 10.

The trajectory tracking error operation unit 15 computes the difference between an object trajectory and the actual trajectory of the robot 10. The output is provided for the parameter estimation value update unit 16 and the adaptive linearization input generation unit 17, and is the amount defined by equation (6). The positive definite matrix Λ tunes the stability of the system adaptively linearized by the adaptive linearization input generation unit 17, and can be specified by a user.

The parameter estimation value update unit 16 updates the estimated values in the system parameter vector σ at each sampling time based on the parameter adjustment rule depending on the output of the trajectory tracking error operation unit 15. The convergence of the parameter adjustment is prescribed by the positive definite matrix Γ. This matrix can be specified by a user.

The adaptive linearization input generation unit 17 generates a partial input for adaptive linearization based on equation (14) depending on the output from the trajectory tracking error operation unit 15, the actual trajectory of the robot 10, and the input of the parameter estimation value as an output from the parameter estimation value update unit 16. The dynamics of the robot 10 which is inherently non-linear are linearized through the partial input. Thus the dynamics of the robot 10 are converted into a linear system containing disturbance by a parameter estimation error and random disturbance such as noise.

The robustness partial input generation unit 18 generates a partial input using the output from the robustness compensator 11, the actual trajectory of the robot 10, and the adaptive gain $\hat{M}(q)$. The estimation value of the inertia matrix $\hat{M}(q)$ as an adaptive gain is updated using the actual trajectory of a robot at each sampling time and an estimation value of a parameter. The output from the robustness partial input generation unit 18 is added to the output from the adaptive linearization input generation unit 17 by the adder 19, and the sum is provided as an input voltage for the actuator of the robot 10.

Figure 4:
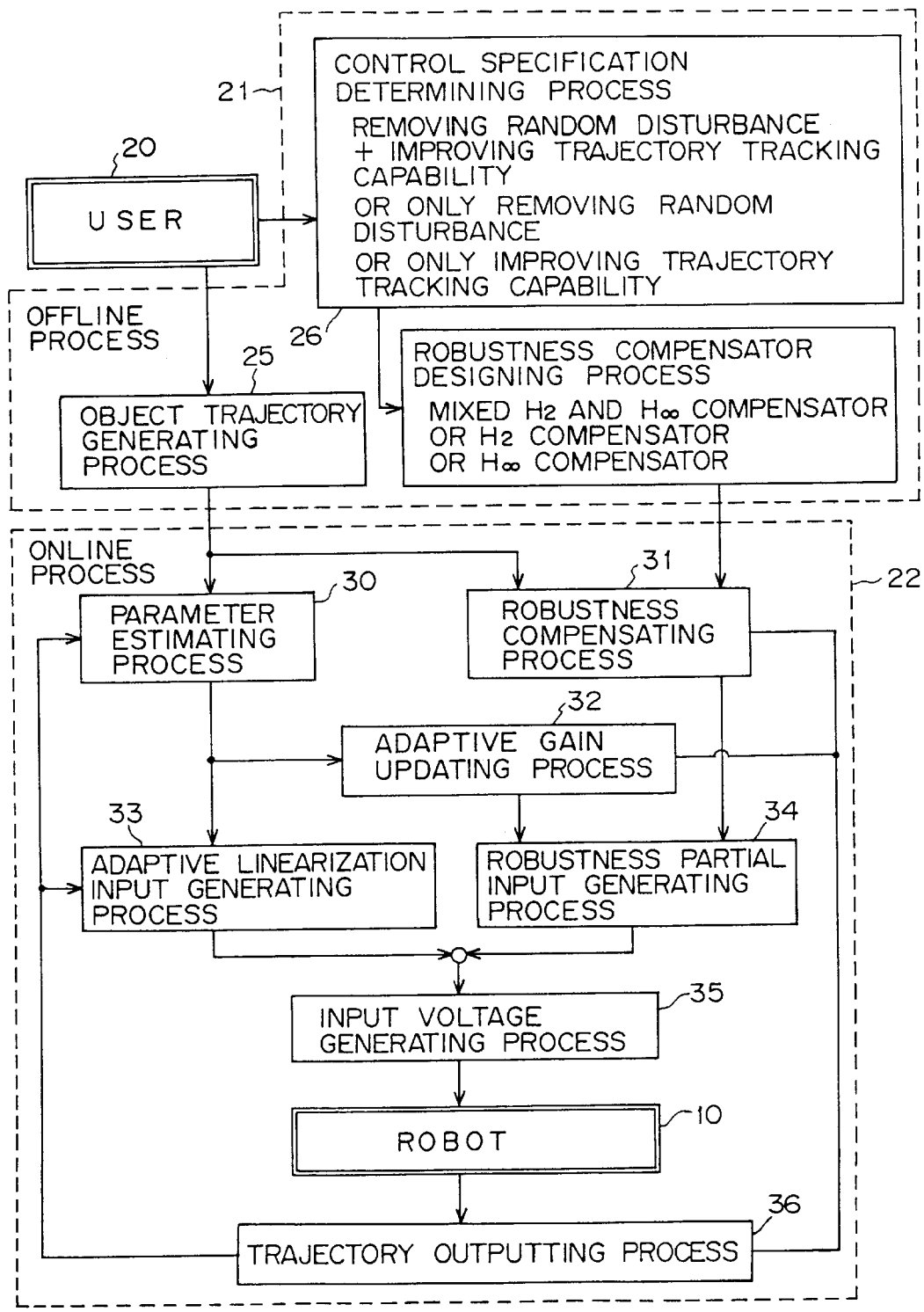
FIG. 4 is a flowchart showing the control algorithm according to the present invention.

FIG. 4 is a flowchart showing the control algorithm in the adaptive robust control device. The flowchart shows the flow of the process performed by the control device which receives an instruction from a user. The entire process includes an offline process 21 and an online process 22.

In the offline process 21, a user 20 specifies the object trajectory of a robot, and an object trajectory generating process 25 is performed at the instruction of the user 20. Then, it is determined, at the instruction of the user 20, whether both rejection of random disturbance and improvement of trajectory tracking capability are performed, only rejection of random disturbance is performed, or only improvement of trajectory tracking capability is performed, as a control specification determining process 26. In a robustness compensator designing process 27 after the control specification determining process 26, the mixed $H_2$ and $H_\infty$ compensator, the $H_2$ compensator, or the $H_\infty$ compensator is designed.

In the online process 22, an input voltage generated by the adaptive robust control device is applied to the robot, which includes the adaptive linearization input and the partial input for robustness.

A parameter estimating process 30 and a trajectory outputting process 36 are required to perform an adaptive linearization input generating process 33. The parameter estimating process 30 is performed on the actual trajectory of the robot and on the input of the data of the object trajectory at each sampling time. That is, in FIG. 3, the processes performed by the trajectory tracking error operation unit 15 and the parameter estimation value update unit 16 are included in the parameter estimating process 30.

The results of an adaptive gain updating process 32 and a robustness compensating process 31 based on the result of the parameter estimating process 30 are required to perform a robustness partial input generating process 34. To perform the robustness compensating process 31, the result of the robustness compensator designing process 27, the object trajectory, and the actual trajectory of the robot are required. Then, the results of the adaptive linearization input generating process 33 and the robustness partial input generating process 34 are added up and an input voltage generating process 35 is performed for the robot.

Figure 5:
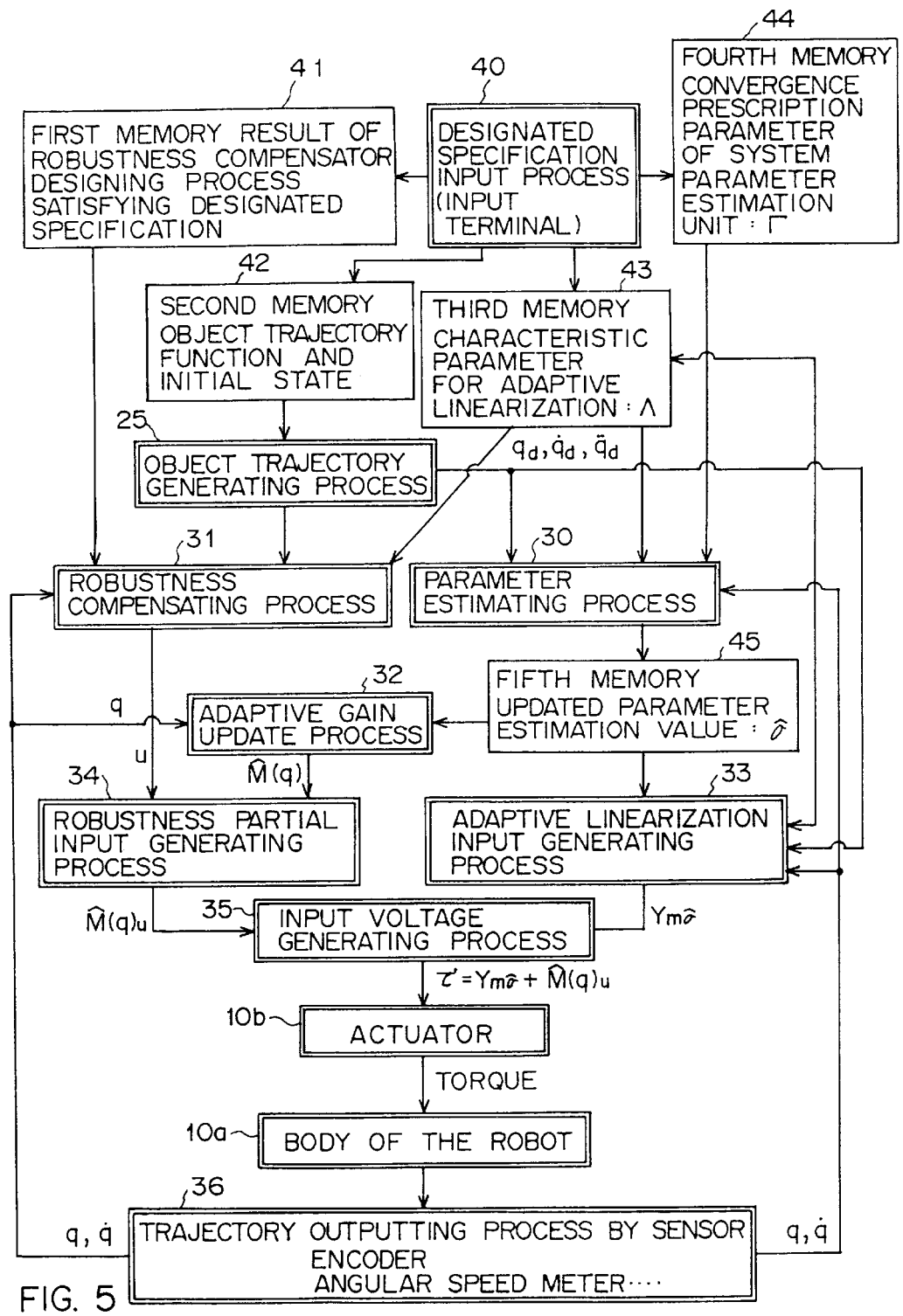
FIG. 5 shows the flow of data in the control flowchart.

FIG. 5 shows the flow of data in the process performed by the adaptive robust control device. In FIG. 5, units also appearing in FIG. 4 are assigned the same identification number. First, in a designated specification input process 40, the process result of the offline process 21 shown in FIG. 4 is stored in the memory. That is, the result of designing the robustness compensator is stored from the input terminal to the memory. The robustness compensator is designed such that a predetermined control specification can be attained by preliminarily specifying the object trajectory of a robot using the control device by the user.

A first memory 41 stores the result of designing the robustness compensator which satisfies the designated specification. That is, the result of designing the mixed $H_2$ and $H_\infty$ compensator, the $H_2$ compensator, or the $H_\infty$ compensator, whichever has been designed as a result of the robustness compensator designing process 27 shown in FIG. 4. A second memory 42 stores the function of the object trajectory and the initial value of the trajectory. A third memory 43 stores the positive definite matrix Λ prescribing the stability of the system to be adaptively linearized by the adaptive linearization input generation unit 17. A fourth memory 44 stores the positive definite matrix Γ specifying the convergence of the adjustment of the system parameter.

In the object trajectory generating process 25, the object trajectory, and its time derivatives $q_d$, $\dot{q}_d$, and $\ddot{q}_d$, are generated.

In the robustness compensating process 31, a compensation input u for a linear system including disturbance by a parameter estimation error and random disturbance such as noise, etc. as a result of the adaptive linearization input generating process 33 using the result of designing the robustness compensator stored in the first memory 41, the object trajectory as a result of the object trajectory generating process 25, the positive definite matrix Λ stored in the third memory 43, and the actual trajectory of the robot as a result of the trajectory output process 36 performed by the sensor, is generated to provide the robustness for the effects of disturbances.

In the parameter estimating process 30, the estimation value of the system parameter of the robot is updated using the result of the object trajectory generating process 25, the positive definite matrix 79 stored in the third memory 43, the matrix Γ stored in the fourth memory 44, and the actual trajectory of the robot as a result of the trajectory output process 36 performed by the sensor. The result of the process is stored in a fifth memory 45.

In the adaptive gain update process 32, an adaptive gain is updated using the estimation value of the system parameter stored in the fifth memory 45, and the actual trajectory of the robot as a result of the trajectory output process 36 performed by the sensor.

In the robustness partial input generating process 34, a partial input for robustness is generated upon receipt of the results of the robustness compensating process 31 and the adaptive gain update process 32 for the purpose of improving the trajectory tracking capability and the precision and convergence speed in estimating a parameter.

In the adaptive linearization input generating process 33, a partial input to linearize the normally nonlinear dynamic characteristic of the robot is generated using the result of the object trajectory generating process 25, the positive definite matrix $\Lambda$ stored in the third memory 43, the parameter estimation value stored in the fifth memory 45, and the actual trajectory of the robot. The linear system obtained by the partial input includes the disturbance by a parameter estimation error and the random disturbance such as noise, etc. However, the influences of the disturbances can be removed by the partial input generated as a result of the robustness partial input generating process 34.

Figure 6:
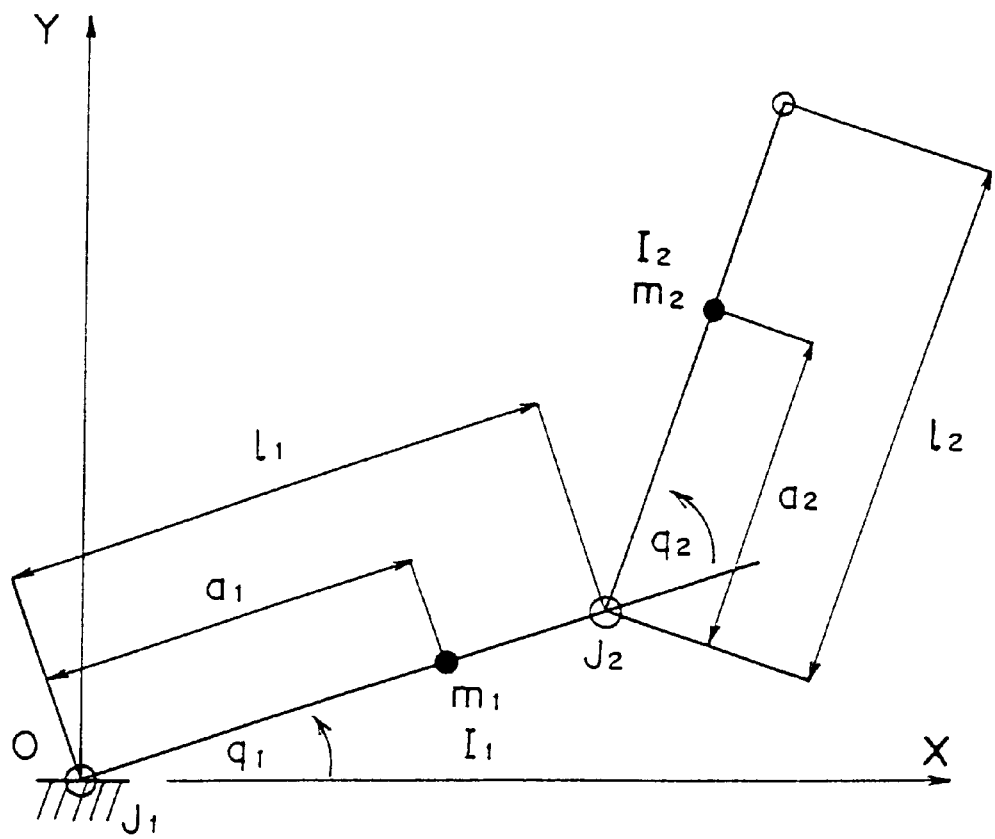
FIG. 6 shows the concept of the robot having 2 degrees of freedom (2DOF)

In the input voltage generating process 35, the results of the adaptive linearization input generating process 33 and the robustness partial input generating process 34 are added up to generate the input voltage to a robot actuator 10b, and the robot actuator 10b generates the control torque to a body 10a of the robot. In the trajectory output process 36 by the sensor, the joint angle is detected by an encoder, and the joint angular speed is detected by a tachometer The practical embodiment of the present invention is described by referring to a 2DOF (degrees of freedom) robot having two links. FIG. 6 shows the concept of a 2DOF robot. The dynamic characteristic of the 2DOF robot is defined by the following equation corresponding to equation (1).

$$\begin{bmatrix} M_{11} & M_{12} \\ M_{21} & M_{22} \end{bmatrix} \begin{bmatrix} \ddot{q}_1 \\ \ddot{q}_2 \end{bmatrix} + \quad (27)$$

$$m_2 l_1 a_2 \sin q_2 \begin{bmatrix} -\dot{q}_2 & -\dot{q}_1 - \dot{q}_2 \\ \dot{q}_1 & 0 \end{bmatrix} \begin{bmatrix} \dot{q}_1 \\ \dot{q}_2 \end{bmatrix} + \begin{bmatrix} G_1 \\ G_2 \end{bmatrix} = \begin{bmatrix} \tau_1 \\ \tau_2 \end{bmatrix}$$

where each element of the matrix is defined as follows.

$M_{11} = m_1 a_1^2 + I_1 + J_1 + m^2(l_1^2 + a_2^2 + 2l_1 a_2 \cos q_2) + I_2$ $M_{12} = M_{21} = m^2(a_2^2 + l_1 a_2 \cos q_2) + I_2$ $M_{22} = m_2 a_2^2 + I_2 + J_2$ $G_1 = m_1 g a_1 \cos q_1 + m_2 g (l_1 \cos q_1 + a_2 \cos(q_1 + q_2))$ $G_2 = m_2 g a_2 \cos(q_1 + q_2)$ \hfill (28)

where $q_i$ (i=1, 2) indicates the rotation angle of joint i, $m_i$ (i=1, 2) indicates the mass of link i, $l_i$ (i=1, 2) indicates the length of link i, $a_i$ (i=1, 2) indicates the length from joint i to the center of the mass of link i, $I_i$ (i=1, 2) indicates the inertial moment around the axis which passes through the center of the mass of link i and is parallel with the Z axis, $J_i$ (i=1, 2) indicates the inertial moment around the axis which passes through the center of the mass of the i-th actuator and is parallel with the Z axis, g indicates the acceleration due to gravity, $\tau_i = k_i \tau_i'$ (i=1, 2) indicates the torque applied by the actuator placed on joint i, and $k_i$ and $\tau_i'$ are respectively the torque constant and the input voltage of the actuator placed on joint i.

In equations (27) and (28), the following parameter is used by combining the physical parameters.

$$\sigma = \begin{bmatrix} \sigma_1 \\ \sigma_2 \\ \sigma_3 \\ \sigma_4 \\ \sigma_5 \\ \sigma_6 \\ \sigma_7 \\ \sigma_8 \\ \sigma_9 \end{bmatrix} = \begin{bmatrix} (m_1 a_1^2 + I_1 + J_1 + m_2 l_1^2)/k_1 \\ (m_2 a_2^2 + I_2)/k_1 \\ m_2 l_1 a_2 / k_1 \\ (m_2 a_2^2 + I_2)/k_2 \\ (m_2 a_2^2 + I_2 + J_2)/k_2 \\ m_2 l_1 a_2 / k_2 \\ (m_1 g a_1 + m_2 g l_1)/k_1 \\ m_2 g a_2 / k_1 \\ m_2 g a_2 / k_2 \end{bmatrix} \quad (29)$$

Actually, since $a_i$ and $k_i$ (i=1, 2) are unknown, the correct value of $\sigma_i$ (i=1 through 9) is unknown. When an trajectory is controlled, the estimation value $\hat{\sigma}_i$ (i=1 through 9) should be used. Therefore, the estimation value $\hat{\sigma}_i$ (i=1 through 9) is written. Using these values, the left-hand-side of equation (27) can be described as follows.

$$\begin{bmatrix} \hat{\sigma}_1 + \hat{\sigma}_2 + 2\hat{\sigma}_3 C_2 & \hat{\sigma}_2 + \hat{\sigma}_3 C_2 \\ \hat{\sigma}_4 + \hat{\sigma}_6 C_2 & \hat{\sigma}_5 \end{bmatrix} \begin{bmatrix} \ddot{q}_{r1} - \lambda_1(\dot{q}_1 - \dot{q}_{r1}) \\ \ddot{q}_{r2} - \lambda_2(\dot{q}_2 - \dot{q}_{r2}) \end{bmatrix} + \quad (30)$$

$$\begin{bmatrix} -\hat{\sigma}_3 S_2 \dot{q}_2 & -\hat{\sigma}_3 S_2 (\dot{q}_1 + \dot{q}_2) \\ \hat{\sigma}_6 S_2 \dot{q}_1 & 0 \end{bmatrix} \begin{bmatrix} \dot{q}_{r1} \\ \dot{q}_{r2} \end{bmatrix} + \begin{bmatrix} \hat{\sigma}_7 C_1 + \hat{\sigma}_8 C_{12} \\ \hat{\sigma}_9 C_{12} \end{bmatrix}$$

where $C_1 = \cos q_1$, $C_{12} = \cos(q_1 + q_2)$, $C_2 = \cos q_2$, $S_2 = \sin q_2$ $\dot{q}_{r1} = \dot{q}_{d1} + \lambda_1(q_{d1} - q_1)$ $\dot{q}_{r2} = \dot{q}_{d2} + \lambda_2(q_{d2} - q_2)$ $\ddot{q}_{r1} = \ddot{q}_{d1} + \lambda_1(\dot{q}_{d1} - \dot{q}_1)$ $\ddot{q}_{r2} = \ddot{q}_{d2} + \lambda_2(\dot{q}_{d2} - \dot{q}_2)$ \hfill (31)

where $q_{di}$ (i=1, 2) indicates the object trajectory of joint i, $\lambda_i$ (i=1, 2) indicates a positive constant. If equation (30) is expressed using the estimation value vector $\hat{\sigma}$ of the parameter of equation (29), then the coefficient matrix $Y_m(q, \dot{q}, \dot{q}_r, \ddot{q}_r)$ of the linear equation (14) relating to the parameter can be obtained as follows.

$$Y_m(q, \dot{q}, \dot{q}_r, \ddot{q}_r) = \begin{bmatrix} \ddot{q}_{rd1} & \ddot{q}_{rd1} + \ddot{q}_{rd2} & 2C_2 \ddot{q}_{rd1} + C_2 \ddot{q}_{rd2} - S_2 \dot{q}_{r1} \dot{q}_2 - S_2 \dot{q}_1 \dot{q}_{r2} - S_2 \dot{q}_{r2} \dot{q}_2 \\ 0 & 0 & 0 \end{bmatrix} \quad (32)$$

$$\begin{bmatrix} 0 & 0 & 0 & C_1 & C_{12} & 0 \\ \ddot{q}_{rd1} & \ddot{q}_{rd2} & C_2 \ddot{q}_{r1} + S_2 \dot{q}_{r1} \dot{q}_1 & 0 & 0 & C_{12} \end{bmatrix}$$

where $\ddot{q}_{rd1} = \ddot{q}_{d1} + 2\lambda_1(\dot{q}_{d1} - \dot{q}_1) + \lambda_1^2(q_{d1} - q_1)$
$\ddot{q}_{rd2} = \ddot{q}_{d2} + 2\lambda_2(\dot{q}_{d2} - \dot{q}_2) + \lambda_2^2(q_{d2} - q_2)$ \hfill (33)

Since the update rule for the parameter estimation value $\hat{\sigma}$ is given by equation (15), the following equation is expressed.

$$\dot{\hat{\sigma}} = \qquad (34)$$
$$-\text{diag}\{1/\Gamma_1 \cdots 1/\Gamma_9\} Y_m(q, \dot{q}, \dot{q}_r, \ddot{q}_r)^T \begin{bmatrix} \dot{q}_1 - \dot{q}_{d1} + \lambda_1(q_1 - d_{d1}) \\ \dot{q}_2 - \dot{q}_{d2} + \lambda_2(q_2 - d_{d2}) \end{bmatrix}$$

where $\tau_1$ through $\tau_9$ are positive constants.

Thus, the input (17) to be generated by the control device according to the present invention is obtained as follows.

$$\begin{bmatrix} \tau_1' \\ \tau_2' \end{bmatrix} = Y_m(q, \dot{q}, \dot{q}_r, \ddot{q}_r)\hat{\sigma} + \begin{bmatrix} \hat{\sigma}_1 + \hat{\sigma}_2 + 2\hat{\sigma}_3 C_2 & \hat{\sigma}_2 + \hat{\sigma}_3 C_2 \\ \hat{\sigma}_4 + \hat{\sigma}_6 C_2 & \hat{\sigma}_5 \end{bmatrix} \begin{bmatrix} u_1 \\ u_2 \end{bmatrix} \quad (35)$$

where $u_i$ (i=1, 2) is a partial input applied from the i-th joint actuator, and the trajectory tracking capability can be improved and the random disturbance can be removed.

The trajectory tracking error is expressed by the equation (36) using equation (19) by applying an input given by the equation (35) from each of the joint actuators.

$$x(t) = \begin{bmatrix} e_1 \\ e_2 \\ \dot{e}_1 \\ \dot{e}_2 \end{bmatrix} = \begin{bmatrix} q_1 - q_{d1} \\ q_2 - q_{d2} \\ \dot{q}_1 - \dot{q}_{d1} \\ \dot{q}_2 - \dot{q}_{d2} \end{bmatrix}, w_0(t) = \begin{bmatrix} w_{01}(t) \\ w_{02}(t) \end{bmatrix}, \quad (36)$$

$$w_1(t) = \begin{bmatrix} w_{11}(t) \\ w_{12}(t) \\ w_{13}(t) \\ w_{14}(t) \end{bmatrix},$$

$$A = \begin{bmatrix} 0 & 0 & 1 & 0 \\ 0 & 0 & 0 & 1 \\ -\lambda_2^2 & 0 & -2\lambda_1 & 0 \\ 0 & -\lambda_2^2 & 0 & -2\lambda_2 \end{bmatrix}, B_0 = \begin{bmatrix} 0 & 0 \\ 0 & 0 \\ \bar{b}_{01} & 0 \\ 0 & \bar{b}_{02} \end{bmatrix},$$

$$B_1 = \begin{bmatrix} 0 & 0 & 0 & 0 \\ 0 & 0 & 0 & 0 \\ 0 & 0 & \bar{b}_{11} & 0 \\ 0 & 0 & 0 & \bar{b}_{12} \end{bmatrix}, B_2 = \begin{bmatrix} 0 & 0 \\ 0 & 0 \\ 1 & 0 \\ 0 & 1 \end{bmatrix}$$

where $w_{01}$ and $w_{02}$ are functions indicating the influence of the estimation error and are bounded, but unknown scalar functions $w_{11}$, $w_{12}$, $w_{13}$, and $w_{14}$ are scalar functions indicating the influence of random disturbance. $\bar{b}_{01}$ and $\bar{b}_{02}$ are positive constants indicating the weight of an estimation error. $\bar{b}_{11}$ and $\bar{b}_{12}$ are positive constants indicating the size of random disturbance.

According to the example of the above described z(t), $C_1$, $D_{12}$, the coefficient matrix relating to z(t) can be set as follows.

$$z(t) = \begin{bmatrix} \bar{q}_1^{1/2} e_1 \\ \bar{q}_2^{1/2} e_1 \\ \bar{q}_3^{1/2} \dot{e}_1 \\ \bar{q}_4^{1/2} \dot{e}_2 \\ \bar{r}_1^{1/2} u_1 \\ \bar{r}_2^{1/2} u_2 \end{bmatrix}, C_1 = \begin{bmatrix} \bar{q}_1^{1/2} & 0 & 0 & 0 \\ 0 & \bar{q}_2^{1/2} & 0 & 0 \\ 0 & 0 & \bar{q}_3^{1/2} & 0 \\ 0 & 0 & 0 & \bar{q}_4^{1/2} \\ 0 & 0 & 0 & 0 \\ 0 & 0 & 0 & 0 \end{bmatrix}, \quad (37)$$

$$D_{12} = \begin{bmatrix} 0 & 0 \\ 0 & 0 \\ 0 & 0 \\ 0 & 0 \\ \bar{r}_1^{1/2} & 0 \\ 0 & \bar{r}_2^{1/2} \end{bmatrix}, Q = \text{diag}\{\bar{q}_1, \bar{q}_2, \bar{q}_3, \bar{q}_4\}$$

where $\bar{q}_i$ (i=1 through 4) and $\bar{r}_j$ (j=1, 2) are constants indicating the amount of a state and the weight of a partial input respectively.

The coefficient matrix relating to the output (amount of observation) y(t) in equation (23) can be set as follows using only an angle sensor.

$$C_2 = \begin{bmatrix} 1 & 0 & 0 & 0 \\ 0 & 1 & 0 & 0 \end{bmatrix}, D_{20} = \begin{bmatrix} d_{201} & 0 \\ 0 & d_{202} \end{bmatrix}, \quad (38)$$

$$D_{21} = \begin{bmatrix} v_1^{1/2} & 0 & 0 & 0 \\ 0 & v_1^{1/2} & 0 & 0 \end{bmatrix}, V = \text{diag}\{v_1, v_2\}$$

where $d_{201}$ and $d_{202}$ are positive constants indicating the weight of an estimation error in the amount of observation. $v_1$ and $v_2$ are positive constants indicating the size of observation noise. Using the above described equations (36), (37), and (38), all coefficient matrices in equation (19) indicating the linear system having the purpose of improving trajectory tracking capability and removing random disturbance have been determined.

Described below again is an example of z(t), $C_1$, and $D_{12}$ for the above described equation (22).

$$z(t) = \begin{bmatrix} Q^{1/2} x(t) \\ R^{1/2} u(t) \end{bmatrix}, C_1 = \begin{bmatrix} Q^{1/2} \\ 0 \end{bmatrix}, D_{12} = \begin{bmatrix} 0 \\ R^{1/2} \end{bmatrix} \quad (39)$$

They correspond to the following control standard for the optima regulator.

$$J_0(u) = \min_u \lim_{t_f \to \infty} \frac{1}{t_f} \int_0^{t_f} (x(t)^T Q x(t) + u(t)^T R u(t)) dt \quad (40)$$

$$= \min_u \lim_{t_f \to \infty} \frac{1}{t_f} \int_0^{t_f} |z(t)|^2 dt$$

where $Q \geq 0$, $R > 0$, R indicates a positive definite matrix, and Q indicates a non-negative definite matrix. Equations (39) and (40) indicate normal methods in an optimum regulator, and indicate the purpose of reducing the control energy proportional to the square of an input and maintaining the state at approximately 0. According to the present embodiment, R, which is obtained by comparing $D_{12}$ in equation (37) with $D_{12}$ in equation (39), is used to show a simple example.

When only the trajectory tracking capability should be improved as the specification of robustness, the $H_\infty$ control theory can be applied.

In the $H_\infty$ control theory, the system described below is operated.

$$G := \begin{bmatrix} A & B_0 & B_2 \\ \hline C_1 & 0 & D_{12} \\ C_2 & D_{20} & 0 \end{bmatrix} \quad (41)$$

Equation (41) expresses the transfer function from (estimation error $w_0$, control input $u(t)$) to (amount of feature $z(t)$, amount of observation $y(t)$). However, the transfer function can also be expressed as follows.

$$\left[\begin{array}{c|c} A & B \\ \hline C & D \end{array}\right] := C(sI - A)^{-1} B + D \quad (42)$$

Based on the $H_\infty$ control theory, $K_\infty$ can be expressed with the following transfer function using $u = K_\infty y$ as a partial input.

$$K_\infty = M_\infty^{(11)} + M_\infty^{(12)} N_\infty (I - M_\infty^{(22)} N_\infty)^{-1} M_\infty^{(21)} \quad (43)$$

where $N_\infty$ indicates an arbitrary, stable, proper, and rational matrix, and $M^{(11)}_\infty$, $M^{(12)}_\infty$, $M^{(21)}_\infty$, and $M^{(22)}_\infty$ are as follows.

$$M_\infty^{(11)} = \left[\begin{array}{c|c} \hat{A} & -Z_\infty L_\infty \\ \hline F_\infty & 0 \end{array}\right], \quad M_\infty^{(12)} = \left[\begin{array}{c|c} \hat{A} & Z_\infty \hat{B}_\infty E_{12}^{-1/2} \\ \hline F_\infty & E_{12}^{-1/2} \end{array}\right] \quad (44)$$

$$M_\infty^{(21)} = \left[\begin{array}{c|c} \hat{A} & -Z_\infty L_\infty \\ \hline -E_{20}^{-1/2} \hat{C}_\infty & E_{20}^{-1/2} \end{array}\right]$$

$$M_\infty^{(22)} = \left[\begin{array}{c|c} \hat{A} & Z_\infty \hat{B}_\infty E_{12}^{-1/2} \\ \hline -E_{20}^{-1/2} \hat{C}_\infty & 0 \end{array}\right]$$

Described below is each matrix in equation (44).

$\hat{A}_\infty = A + \gamma^{-2} B_0 B_0^T X_\infty + B_2 F_\infty + Z_\infty L_\infty \hat{C}_\infty$ $\hat{B}_\infty = B_2 + Y_\infty C_1^T D_{12}$ $\hat{C}_\infty = C_2 + D_{20} B_0^T X_\infty$ $F_\infty = -D_{12}^+ D_1 - (D_{12}^T D_{12})^{-1} B_2^T X_\infty$ $L_\infty = -B_0 D_{20}^+ - Y_\infty C_2^T (D_{20} D_{20}^T)^{-1}$ $Z_\infty = (I - \gamma^{-2} Y_\infty X_\infty)^{-1}$ $E_{12} = D_{12}^T D_{12}, \; E_{20} = D_{20} D_{20}^T \quad (45)$ where $D^+_{12} = (D^T_{12} D_{12})^{-1} D^T_{12}$, $D^+_{20} = D^T_{20}(D_{20} D^T_{20})^{-1}$ Furthermore, $X_\infty$ and $Y_\infty$ are solutions to the Riccati matrix equation corresponding to the following Hamilton matrix.

$$X_\infty = \text{Ric}\begin{bmatrix} A - B_2 D_{12}^+ C_1 & \gamma^{-2} B_0 B_0^T - B_2 (D_{12}^T D_{12})^{-1} B_2^T \\ -C_1^T(I - D_{12} D_{12}^+) C_1 & -(A - B_2 D_{12}^+ C_1)^T \end{bmatrix} \quad (46)$$

$$Y_\infty = \text{Ric}\begin{bmatrix} (A - B_2 D_{20}^+ C_2)^T & \gamma^{-2} C_1^T C_1 - C_2^T (D_{20} D_{20}^T)^{-1} C_2 \\ -B_0^T(I - D_{20}^T D_{20}) B_0^T & -(A - B_0 D_{20}^+ C_2) \end{bmatrix} \quad (47)$$

However, Ric($\cdot$) in equations (46) and (47) refers to the following equation.

$$X = \text{Ric}\begin{bmatrix} A & R \\ -Q & -A^T \end{bmatrix} \iff XA + A^T X + XRX + Q = 0$$

When the specification of the robustness is limited to the removal of random disturbance, the $H_2$ control theory is applied.

In the $H_2$ control theory, the below described system is operated.

$$G := \begin{bmatrix} A & B_0 & B_2 \\ \hline C_1 & 0 & D_{12} \\ C_2 & D_{21} & 0 \end{bmatrix} \quad (48)$$

Equation (48) expresses the transfer function from (random disturbance $w_1$, control input $u(t)$) to (amount of feature $z(t)$, amount of observation $y(t)$).

Based on the $H_2$ control theory, $K_2$ can be expressed with the following transfer function using $u = K_2 y$ as a partial input $$K_2 = M_2^{(11)} + M_2^{(12)} N_2 (I - M_2^{(22)} N_2)^{-1} M_2^{(21)}, \quad (49)$$

where $N_2$ indicates an arbitrary, stable, proper, and rational matrix, and $M_2^{(11)}$, $M_2^{(12)}$, $M_2^{(21)}$, and $M_2^{(22)}$ are as follows.

$$M_2^{(11)} = \left[\begin{array}{c|c} \hat{A}_2 & -L_2 \\ \hline F_2 & 0 \end{array}\right], \quad M_2^{(12)} = \left[\begin{array}{c|c} \hat{A}_2 & \hat{B}_2 E_{12}^{-1/2} \\ \hline F_2 & E_{12}^{-1/2} \end{array}\right], \quad (50)$$

$$M_2^{(21)} = \left[\begin{array}{c|c} \hat{A}_2 & -L_2 \\ \hline -E_{21}^{-1/2} \hat{C}_2 & E_{21}^{-1/2} \end{array}\right], \quad M_2^{(22)} = \left[\begin{array}{c|c} \hat{A}_2 & \hat{B}_2 \\ \hline -E_{21}^{-1/2} \hat{C}_2 & 0 \end{array}\right]$$

Described below is each matrix in equation (50).

$\hat{A}_2 = A + L_2 C_2 + B_2 F_2$ $\hat{B}_2 = B_2 + Y_2 C_1^T D_{12}$ $\hat{C}_2 = C_2 + D_{21} B_1^T X_2$ $F_2 = -D_{12}^+ C_1 - (D_{12}^T D_{12})^{-1} B_2^T X_2$ $L_2 = -B_1 D_{21}^+ - Y_2 C_2^T (D_{21} D_{21}^T)^{-1}$ $E_{12} = D_{12}^T D_{12}, \; E_{21} = D_{21} D_{21}^T \quad (51)$ where $D^+_{21} = D^T_{21}(D_{21} D^T_{21})^{-1}$, and $X_2$ and $Y_2$ are solutions to the Riccati matrix equation corresponding to the following Hamilton matrix.

$$X_2 = \text{Ric}\begin{bmatrix} A - B_2 D_{12}^+ C_1 & -B_2(D_{12}^T D_{12})^{-1} B_2^T \\ -C_1^T(I - D_{12} D_{12}^+) C_1 & -(A - B_2 D_{12}^+ C_1)^T \end{bmatrix} \quad (52)$$

-continued $$Y_2 = \text{Ric}\begin{bmatrix} (A-B_1D_{21}^+C_2)^T & -C_2^T(D_{21}D_{21}^T)^{-1}C_2 \\ -B_1(I-D_{21}^TD_{21})B_1^T & -(A-B_1D_{21}^+C_2) \end{bmatrix} \quad (53)$$

where a normal LQG problem can be described if the following equation (54) is given as an example of the transfer function from (random disturbance $w_1$, partial input u) to (amount of feature z, amount of observation y) in equation (48).

$$G_2 = \begin{bmatrix} A & [0 \; W^{1/2}] & B^2 \\ \begin{bmatrix} Q^{1/2} \\ 0 \end{bmatrix} & 0 & \begin{bmatrix} 0 \\ R^{1/2} \end{bmatrix} \\ C_2 & [V^{1/2} \; 0] & 0 \end{bmatrix} \quad (54)$$

At this time, the input $u=K_2y$ which minimizes the value of $|T_{zw1}|_2$ can be a feedback input comprising the Kalman filter output by selecting $N_2=0$ in equation (49). That is, the following compensator $K_2$ can be obtained.

$$K_2 = \begin{bmatrix} \hat{A} & \hat{B} \\ \hat{C} & 0 \end{bmatrix} \quad (55)$$

where the following equation can be expressed.

$$\hat{A} = A + B_2F_2 + L_2C_2 \quad (56)$$

$$\hat{C} = F_2 = -R^{-1}B_2^TX_2 \quad (57)$$

$$\hat{B} = L_2 = Y_2C_2^TV^{-1} \quad (58)$$

where $X_2$ and $Y_2$ are solutions to the Riccati equation corresponding to the following Hamilton matrix.

$$X_2 = \text{Ric}\begin{bmatrix} A & -B_2R^{-1}B_2^T \\ -Q & -A^T \end{bmatrix} \quad (59)$$

$$Y_2 = \text{Ric}\begin{bmatrix} A^T & -C_2^TV^{-1}C_2 \\ -W & -A \end{bmatrix} \quad (60)$$

There are various software packages already developed for use in individually applying the above described $H_\infty$ theory or the $H_2$ theory. Only inputting the coefficient matrices obtained by equations (36) through (38) to the software packages allows the partial inputs $u_1$ and $u_2$ to be easily computed.

However, if both improvement of trajectory tracking capability and removal of random disturbance are to be simultaneously performed, it is necessary to generate partial inputs $u_1$ and $u_2$ based on the mixed $H_2$ and $H_\infty$ control theory.

In the mixed $H_2$ and $H_\infty$ control theory, the below described system is operated.

$$G := \begin{bmatrix} A & B_0 & B_1 & B_2 \\ C_1 & 0 & 0 & D_{12} \\ C_2 & D_{20} & D_{21} & 0 \end{bmatrix} \quad (61)$$

Equation (61) expresses the transfer function from (disturbance $w_0, w_1$, control input u(t)) to (amount of feature z(t), amount of observation y(t)).

Based on the mixed $H_2$ and $H_\infty$ control theory, $K_m$ can be expressed with the following transfer function using $u=K_m y$ as a partial input.

$$K_m = \begin{bmatrix} A_m + B_2F_m & L_m \\ -F_m & 0 \end{bmatrix} \quad (62)$$

where the following equations are expressed.

$$A_m = A + \gamma^{-2}B_0B_0^TX_\infty + L_m(C_2 + \gamma_{-2}D_{20}B_0^TX_\infty) \quad (63)$$

$$F_m = -(D_{12}^TC_1 + B_2^TX_\infty) \quad (64)$$

where $X_\infty$ is a solution to the Riccati equation (46) appearing in the $H_\infty$ control theory. $M_m$, $P_m$, and $Y_m$ in equations (62) and (63) are obtained by the solutions of the following simultaneous equations.

$$P_m(L_mD_{21}D_{21}^T + B_1D_{21}^T + Y_mC_2^T + \gamma^{-2}Y_mX_\infty B_0D_{20}^T + \gamma^{-2}Y_mP_mL_mD_{20}D_{20}^T + \gamma^{-2}Y_mP_mB_0D_{20}^T) = 0 \quad (65)$$

$$P_mA_m + A_m^TP_m + \gamma^{-2}P_m(B_0+L_mD_{20})(B_0+L_mD_{20})^TP_m + F_m^TF_m = 0 \quad (66)$$

$$\{A_m + \gamma^{-2}(B_0L_mD_{20})(B_0 + L_mD_{20})^TP_m\}Y_m + \quad (67)$$
$$Y_m\{A_m + \gamma^{-2}(B_0 + L_mD_{20})(B_0 + L_mD_{20})^TP_m\}^T +$$
$$(B_1 + L_mD_{21})(B_1 + L_mD_{21})^T = 0$$

If $\gamma$ is tends to $\infty$, then $L_m$ converges with $L_2$, $F_m$ converges with $F_2$, $X_\infty$ converges with $X_2$, and $Y_m$ converges with $Y_2$. In this case, the input by equation (62) matches the input obtained when $N_2=0$ in equation (49) indicating the input based on the $H_2$ control theory.

If both improvement of trajectory tracking capability and removal of random disturbance are to be simultaneously performed, it is necessary to solve the above described three equations (65) through (67) as simultaneous equations. Although it is difficult to solve the equations strictly for $L_m$, $Y_m$, and $P_m$, the equation can be approximately solved by sequentially fixing one of the three variables in each computation step in the arithmetic operations.

Figure 7:
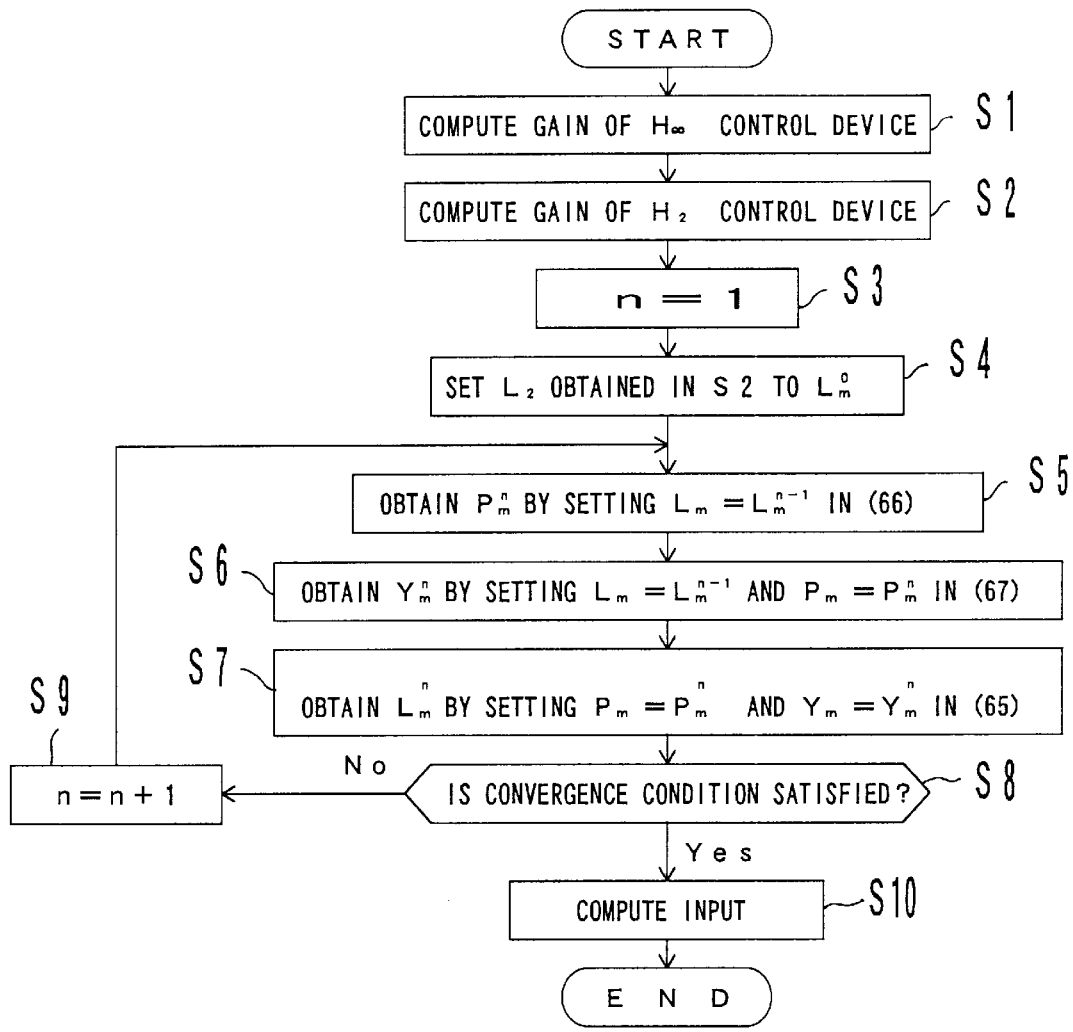
FIG. 7 is a flowchart showing the simultaneous matrix equation solving process.

FIG. 7 is a flowchart showing the computing process. When the process starts as shown in FIG. 7, the gain of the $H_\infty$ control device is computed in step S1. In this step, the gain of the H*∞ control device is obtained by equations (43) through (47) based on the coefficient matrix set by equations (36) through (38). The value of the parameter $\gamma$ is selected so that the solutions to equations (46) and (47) exist.

Then, in step S2, the gain of the $H_2$ control device is computed. In this step, the gain of the $H_2$ control device is obtained by equations (49) through (53) based on the coefficient matrix set by equations (36) through (38). Then, in step S3, n is set to 1, and the value of $L_2$ computed in step S2 is substituted for the value $L^0{}_m$. The processes in steps S5 through S9 are repeated until the convergence conditions are satisfied.

In step S5, the value of $L_m$ is fixed to $L^{n-1}{}_m$, equation (66) is solved for $P_m$, and the result is $P^n{}_m$. In step S6, $L_m$ is fixed to $L^{n-1}{}_m$, and $P_m$ is fixed to $P^n{}_m$. Equation (67) is solved for $Y_m$ and the result is $Y^n{}_m$. In step S7, $P_m$ is fixed to $P^n{}_m$, and $Y_m$ is fixed to $Y^n{}_m$. Equation (65) is solved for $L_m$, and the result is $L^n{}_m$.

In step S8, the convergence conditions are checked to determine whether or not the computation has converged. The following equation is used to check the convergence conditions.

$$|L^n{}_m - L^{n-1}{}_m| < \epsilon$$

where $\epsilon$ indicates a convergence determination index.

If the convergence conditions are not satisfied, the value of n is incremented in step S9, and the processes in and after step S5 are repeated. If the convergence conditions are satisfied, then the input to be generated by the mixed $H_2$ and $H_\infty$ compensator is computed by equations (62) through (64) in step S10, thereby terminating the process.

Figure 8:
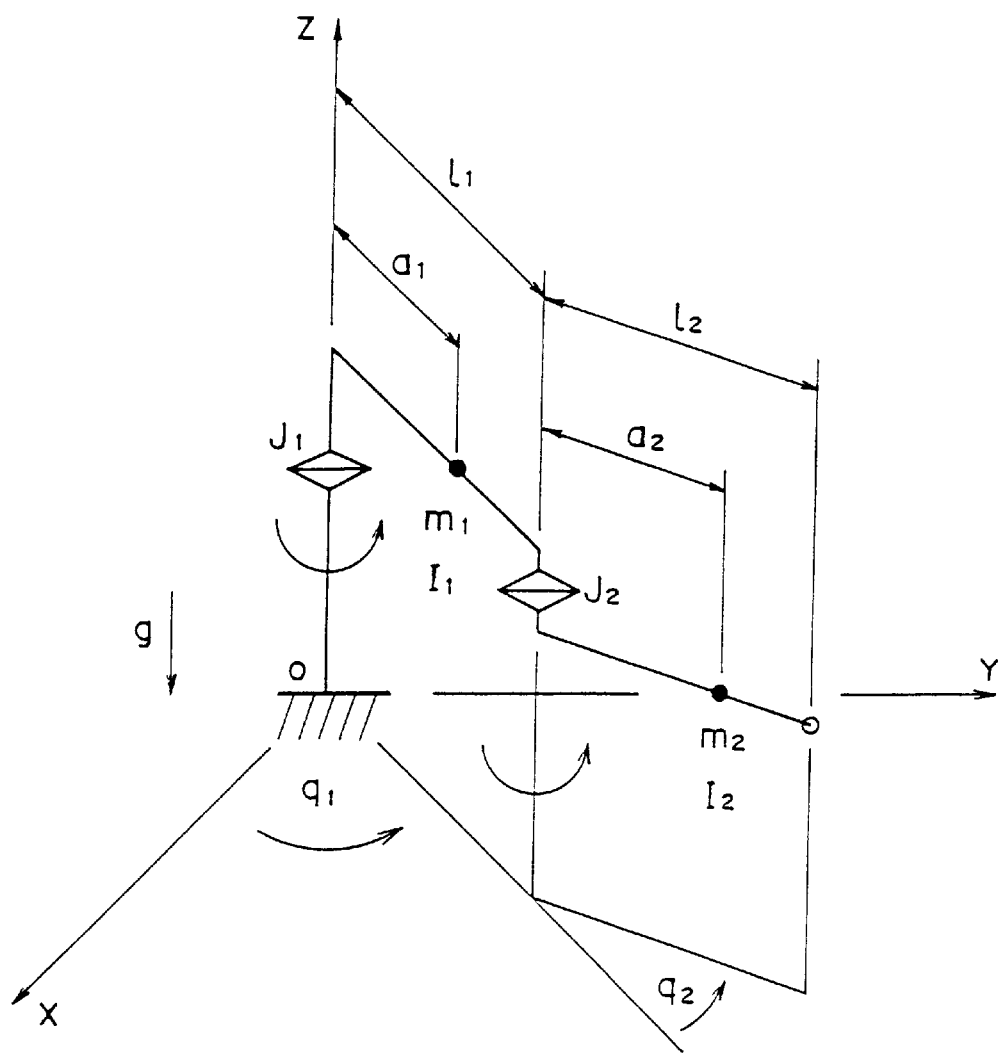
FIG. 8 shows the concept of the SCARA type robot.

Finally, the control simulation in the adaptive robust control device according to the present invention is described. FIG. 8 shows the concept of the SCARA type robot as an object of the simulation. FIG. 9 shows the physical parameters of the robot. The direction of the displacement of joint motion of such a SCARA type robot is independent of the direction of gravity, and is not subject to an influence of gravity as compared with the robot formed as shown in FIG. 6. Therefore, it can easily realize a high-speed and high precision system, and is actually used in various fields such as an assembly process, etc.

When such a SCARA type robot is processed, the gravity term as the third term of the left-hand-side of equation (27) can be ignored. Only $\sigma_1$ through $\sigma_6$ should be considered in the parameters in equation (29), that is, the third term in equation (30) corresponds to the gravity term in equation (27). Described below are the conditions used in the numerical simulation.

Sampling Cycle $$\Delta t = 2^{-6} \text{ through } 0.0156$$

Object trajectory $$q_{1d}(t)=1.5 \cos t + 0.5, \ q_{1d}(0)=2.0$$

$$q_{2d}(t)=\cos t + 1.0, \ q_{2d}(0)=2.0$$

Positive Definite Matrix $\Lambda$ prescribing the tracking capability to an object trajectory (refer to equations (6) an (17))

$$\Lambda = \begin{bmatrix} \lambda_1 & 0 \\ 0 & \lambda_2 \end{bmatrix} = \begin{bmatrix} 3 & 0 \\ 0 & 3 \end{bmatrix}$$

Positive Definite Matrix $\Gamma$ in equation (15) of the update rule for parameter estimation value $$\Gamma = \text{diag } \{20,100,100,50,50,50\}$$

Random disturbance term $w_1(t)$ (prescribing the disturbance to the robot and observation noise)

$$w_1(t) = \begin{bmatrix} \gamma_{11}/\sqrt{\Delta t} \\ \gamma_{12}/\sqrt{\Delta t} \\ \gamma_{13}/\sqrt{\Delta t} \\ \gamma_{14}/\sqrt{\Delta t} \end{bmatrix}$$

$\gamma_{11}, \gamma_{12}$: normal random number series of mean 0 and variance 0.01. They are independent of each other.

$\gamma_{13}, \gamma_{14}$: normal random number series of mean 0 and variance 1. They are independent of each other.

Setting other parameters $$B_0 = \begin{bmatrix} 0 & 0 \\ 0 & 0 \\ 1 & 0 \\ 0 & 1 \end{bmatrix}, B_1 = \begin{bmatrix} 0 & 0 & 0 & 0 \\ 0 & 0 & 0 & 0 \\ 0 & 0 & 1 & 0 \\ 0 & 0 & 0 & 1 \end{bmatrix},$$

$$C_1 = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \\ 0 & 0 & 0 & 0 \end{bmatrix}, D_{12} = \begin{bmatrix} 0 & 0 \\ 0 & 0 \\ 0 & 0 \\ 0 & 0 \\ 0.1 & 0 \\ 0 & 0.1 \end{bmatrix},$$

$$D_{20} = \begin{bmatrix} 1 & 0 \\ 0 & 1 \end{bmatrix}, D_{21} = \begin{bmatrix} 1 & 0 & 0 & 0 \\ 0 & 1 & 0 & 0 \end{bmatrix}$$

An input generated by the suggested control device (refer to equation (17)) can be computed by setting each parameter as described above. Especially, the partial input to simultaneously realize the improvement of trajectory tracking capability and the rejection of random disturbance should be generated based on the mixed $H_2$ and $H_\infty$ control theory. To attain this, the three simultaneous matrix equations (65), (66), and (67) should be numerically solved for $L_m$, $Y_m$, and $P_m$ in the procedure shown in FIG. 7.

First, in step S1, the gain of the $H_\infty$ control device should be computed. The computation can be easily performed using the hinfopt routine of the robust control toolbox in the matrix computation software package MATLAB. As a result, the optimum value for $\gamma$ (refer to equation (24)) can be $\gamma_{opt}=11.688$.

Under the conditions, the $H_\infty$ control gain and the solution to the Riccati equation in equation (46) can be obtained as follows.

$$X_\infty = \begin{bmatrix} 6.07694620 & 0 & -2.36142148 & 0 \\ 0 & 6.07694620 & 0 & -2.36142148 \\ -2.36142148 & 0 & 5.21131236 & 0 \\ 0 & -2.36142148 & 0 & 5.21131236 \end{bmatrix}$$

Using the result, $F_m = -(D^T_{12}C_1 + B^T_2 X_\infty)$, which is required in structuring a compensator, can be computed as follows using equation (62).

$$F_m = \begin{bmatrix} 2.36142148 & 0 & -5.21131236 & 0 \\ 0 & 2.36142148 & 0 & -5.21131236 \end{bmatrix}$$

Then, in step S2, the gain of the $H_2$ control device should be computed. The computation can also be easily performed using the h21qg routine of the robust control toolbox in the software package MATLAB. In step S2, $L_2$ (refer to equation (51)) in the $H_2$ control theory required in and after step S4 can be obtained as follows.

$$L_2 = \begin{bmatrix} -36.15659570 & 0 \\ 0 & -36.15659570 \\ -4.45362405 & 0 \\ 0 & -4.45362405 \end{bmatrix}$$

Equations (65), (66), and (67) are solved for $L_m$, $Y_m$, and $P_m$ in the procedure from step S4 to S9. At this time, if the convergence determination index $\epsilon$ in step S8 is set to 0.01

($\epsilon$=0.01), $L_m$ required to compute a partial input gain in the mixed $H_2$ and $H_\infty$ control theory can converge to the following value after 10 repetitions.

$$L_m = \begin{bmatrix} -0.014232528 & 0 \\ 0 & -0.0057548867 \\ -0.021280327 & 0 \\ 0 & -0.0099788795 \end{bmatrix}$$

To set the partial input $u=K_m$ y by equation (62), the following filter can be considered. The filter has the amount y of the observation obtained online as an input.

$$\dot{\hat{x}} = \{A + \gamma^{-2}B_0B_0^T X\infty + L_m(C_2 + \gamma^{-2}D_{20}B_0^T X_\infty) + B_2F_m\}\hat{x} + L_m y,$$

$$\hat{x}(0) = \hat{x}_0 > 0.$$

Using the output of the filter, the partial input u to simultaneously realize the improvement of trajectory tracking capability and the rejection of random disturbance can be set as follows.

$$u = -F_m\hat{x}$$

Substituting the value in equation (17) allows the control torque τ generated by the adaptive robust control device to be computed.

FIGS. 10 through 25 show the results of the numerical simulation. FIGS. 10 through 13 shows the simulation result of the case where the improvement of trajectory tracking capability and the rejection of random disturbance are simultaneously realized, that is, where the result of the simulation based on the mixed $H_2$ and $H_\infty$ control theory is used. FIG. 11 shows a change in joint angle obtained when the input voltage shown in FIG. 10 is given. For clarification, the object trajectory is indicated by dotted lines. FIG. 12 shows an error of each joint angle. FIG. 13 shows the parameter estimation result. The dotted lines shown in FIG. 13 indicate the true values of the parameter.

FIGS. 14 through 17 show the results of the simulation on the prior art technology of the adaptive control device, that is, the conventional technology explained by referring to equations (4) through (16). In comparison of these figures with FIGS. 10 through 13, it is obvious that the adaptive robust control device according to the present invention can improve the trajectory tracking capability and parameter estimation capability.

FIGS. 18 through 21 show the result of the simulation when the $H_2$ control theory is applied only to remove random disturbance. FIGS. 22 through 25 show the result of the simulation when the $H_\infty$ control theory is applied only to improve trajectory tracking capability. As compared with these figures, FIGS. 10 through 13 show the case where both the rejection of random disturbance and the improvement of trajectory tracking capability are performed, and show excellent trajectory tracking capability and parameter estimation. When the $H_2$ control theory or the $H_\infty$ control theory is individually used, a compensator can be obtained by using the robust control tool box with the software containing routines relating to matrix computation, that is, the MAT-LAB.

As described above in detail, the present invention allows a robot to adaptively track a trajectory with robustness using an adaptive robust control device capable of operating a robot which normally cannot correctly identify a coefficient matrix in a dynamic characteristic model and is subject to the influence of random disturbance such as noise. Thus, the present invention significantly contributes to the practical use of a robot.

What is claimed is:

1. An adaptive robust control device which allows a system under conditions of random disturbance to track an object trajectory using an unknown physical parameter of the system featuring a dynamic characteristic, comprising:

parameter estimation means for estimating the physical parameters of the system;

adaptive linearization input generation means for generating a partial input to perform an adaptive linearization compensation on the system based on an estimation result from said parameter estimation means; and robustness partial input generation means for generating a robustness partial input based on one of a mixed $H_2$ and $H_\infty$ control theory, an $H_2$ control theory, and an $H_\infty$ control theory to improve robustness of the system linearized by said adaptive linearization input generation means.

2. The adaptive robust control device according to claim 1, wherein specification of the robustness of the system to be improved refers to reduction of an influence of a modelling error of the system and to minimization of an influence of a random disturbance.

3. The adaptive robust control device according to claim 2, wherein said robustness partial input generation means generates the partial input based on the mixed $H_2$ and $H_\infty$ control theory to realize the specification of the robustness.

4. The adaptive robust control device according to claim 3, wherein said robustness partial input generation means comprises simultaneous matrix equation solving means for obtaining an approximation of a numerical solution to simultaneous matrix equations in the mixed $H_2$ and $H_\infty$ control theory.

5. The adaptive robust control device according to claim 1, wherein specification of the robustness of the system to be improved refers to reduction of an influence of a modelling error of the system.

6. The adaptive robust control device according to claim 5, wherein said robustness partial input generation means generates the partial input based on the $H_\infty$ control theory to realize the specification of the robustness.

7. The adaptive robust control device according to claim 1, wherein said specification of the robustness of the system to be improved refers to minimization of the influence of the random disturbance.

8. The adaptive robust control device according to claim 7, wherein said robustness partial input generation means generates the partial input based on the $H_2$ control theory to realize the specification of the robustness.

9. An adaptive robust control device which allows a system under conditions of random disturbance to track an object trajectory using an unknown physical parameter of the system featuring a dynamic characteristic, comprising:

robustness compensator for providing an output for reducing of an influence of a modeling error and/or minimizing of an influence of a random disturbance based on the object trajectory of the system and an actual trajectory; and adaptive linearization compensator for performing adaptive linearization compensation on the system based on the object trajectory of the system, the actual trajectory, and the output from said robustness compensator.

10. The adaptive robust control device according to claim 9, wherein said adaptive linearization compensator comprises:

trajectory tracking error operation unit for obtaining the trajectory tracking error based on the object trajectory of the system and the actual trajectory;

parameter estimation value update unit for updating an estimation value of the physical parameter of the system based on said trajectory tracking error operation unit;

robustness partial input generation unit for generating a robustness partial input for the system based on outputs from said parameter estimation value update unit and said robustness compensator, and the actual trajectory of the system;

adaptive linearization input generation unit for generating an adaptive linearization partial input for the system based on outputs from said parameter estimation value update unit and said trajectory tracking error operation unit, and the actual trajectory of the system; and adder for adding up outputs from said robustness partial input generation unit and said adaptive linearization input generation unit and outputting a sum as an input to the system.

11. A control method for use with an adaptive robust control device which allows a system under conditions of random disturbance to track an object trajectory using an unknown physical parameter of the system featuring a dynamic characteristic, comprising:

an offline process comprising an object trajectory generating process for determining an object trajectory of the system at an instruction of a user; a control specification determining process for determining a control specification at the instruction of the user whether both rejection of random disturbance and improvement of trajectory tracking capability are performed, rejection of random disturbance is performed, or improvement of trajectory tracking capability is performed; and a robustness compensator designing process for designing one of a mixed $H_2$ and $H_\infty$ compensator, an $H_2$ compensator, and an $H_\infty$ compensator based on a result of the control specification determining process; and an online process for actually controlling the system based on a result of the offline process.

12. The control method according to claim 11, wherein said online process comprises:

a parameter estimating process for estimating the physical parameters of the system based on a result of the object trajectory generating process and the actual trajectory of the system;

a robustness compensating process for generating a compensation element for compensating the robustness based on results of the object trajectory generating process and a robustness compensator designing process, and the actual trajectory of the system;

an adaptive gain updating process for updating an adaptive gain based on a result of the parameter estimating process and the actual trajectory of the system;

an adaptive linearization input generating process for generating a partial input for adaptive linearization of the system based on the result of the parameter estimating process and the actual trajectory of the system;

a robustness partial input generating process for generating a partial input for robustness of the system based on results of the robustness compensating process and the adaptive gain updating process;

an input voltage generating process for adding up results of the adaptive linearization input generating process and the robustness partial input generating process, and for generating an input voltage for the robot actuator; and a trajectory outputting process for outputting the actual trajectory of the system.

13. A computer-readable storage medium storing a program used to direct a computer, with an adaptive robust control device which allows a system under conditions of random disturbance to track an object trajectory using an unknown physical parameter of the system featuring a dynamic characteristic, to perform the functions of:

estimating the physical parameters of the system;

obtaining a partial input to perform an adaptive linearization compensation on the system based on an estimation result for the physical parameters; and obtaining a partial input based on one of a mixed $H_2$ and $H_\infty$ control theory, an $H_2$ control theory, and an $H_\infty$ control theory to improve robustness of the system linearized by the adaptive linearization compensation.

14. A computer-readable storage medium storing a program used to direct a computer, with an adaptive robust control device which allows a system under conditions of random disturbance to track an object trajectory using an unknown physical parameter of the system featuring a dynamic characteristic, to perform the functions of:

obtaining an output for reducing of an influence of a modeling error and/or minimizing of an influence of a random disturbance based on the object trajectory of the system and an actual trajectory; and obtaining an input for adaptive linearization compensation for the system based on the object trajectory of the system, the actual trajectory, and the output for robustness compensation.

15. The storage medium according to claim 14, wherein said function of obtaining an input for adaptive linearization compensation comprises the functions of:

obtaining the trajectory tracking error based on the object trajectory of the system and the actual trajectory;

updating an estimation value of the physical parameter of the system based on the obtained trajectory tracking error;

obtaining a robustness partial input for the system based on results of parameter estimation value update and outputs for robustness compensation, and the actual trajectory of the system;

obtaining an adaptive linearization partial input for the system based on a parameter estimation value update result and the obtained trajectory tracking error, and the actual trajectory of the system; and adding up the obtained robustness partial input and the adaptive linearization partial input and obtaining an input for the adaptive linearization.

16. A computer-readable storage medium storing a program used to direct a computer, with an adaptive robust control device which allows a system under conditions of random disturbance to track an object trajectory using an unknown physical parameter of the system featuring a dynamic characteristic, to perform the functions of:

an offline process comprising an object trajectory generating process for determining an object trajectory of the system at an instruction of a user; a control specification determining process for determining a control specification at the instruction of the user whether both rejection of random disturbance and improvement of trajectory tracking capability are performed, rejection of random disturbance is performed, or improvement of trajectory tracking capability is performed; and a robustness compensator designing process for designing one of a mixed $H_2$ and $H_\infty$ compensator, an $H_2$ compensator, and an $H_\infty$ compensator based on a result of the control specification determining process; and an online process for actually controlling the system based on a result of the offline process.

17. The storage medium according to claim 16, wherein said online process comprises:

a parameter estimating process for estimating the physical parameters of the system based on a result of the object trajectory generating process and the actual trajectory of the system;

a robustness compensation element computing process for obtaining a compensation element for compensating the robustness based on results of the object trajectory generating process and a robustness compensator designing process, and the actual trajectory of the system;

an adaptive gain updating process for updating an adaptive gain based on a result of the parameter estimating process and the actual trajectory of the system;

an adaptive linearization input computing process for obtaining a partial input for adaptive linearization of the system based on the result of the parameter estimating process and the actual trajectory of the system;

a robustness partial input computing process for obtaining a partial input for robustness of the system based on results of the robustness compensation element computing process and the adaptive gain updating process;

an input voltage computing process for adding up results of the adaptive linearization input computing process and the robustness partial input computing process, and for obtaining an input voltage for the robot actuator; and a trajectory outputting process for outputting the actual trajectory of the system.

* * * * *